(12) United States Patent
Nashimoto

(10) Patent No.: US 8,233,188 B2
(45) Date of Patent: Jul. 31, 2012

(54) APPARATUS AND METHOD THAT REDUCES STREAKING BY USING A DEFORMED DATA PORTION TO NOT ARRAY DOTS CONTINUOUSLY IN THE MAIN SCAN DIRECTION OF THE PRINT HEAD IN THE END PORTIONS OF THE SUB-SCAN DIRECTION

(75) Inventor: Katsumi Nashimoto, Suwa-gun (JP)

(73) Assignee: Mutoh Industries Ltd., Tokyo (JP)

( * ) Notice: Subject to any disclaimer, the term of this patent is extended or adjusted under 35 U.S.C. 154(b) by 567 days.

(21) Appl. No.: 12/528,885

(22) PCT Filed: Mar. 8, 2008

(86) PCT No.: PCT/JP2008/000498
§ 371 (c)(1),
(2), (4) Date: Aug. 27, 2009

(87) PCT Pub. No.: WO2008/129768
PCT Pub. Date: Oct. 30, 2008

(65) Prior Publication Data
US 2010/0110131 A1 May 6, 2010

(30) Foreign Application Priority Data

Mar. 22, 2007 (JP) ................................. 2007-073918

(51) Int. Cl.
*H04N 1/034* (2006.01)
*H04N 1/409* (2006.01)
*B41J 2/07* (2006.01)
(52) U.S. Cl. ............. 358/1.8; 358/3.26; 347/10; 347/12
(58) Field of Classification Search ................... 358/1.8, 358/1.9, 3.26, 502, 443, 448, 463, 296; 347/9–15
See application file for complete search history.

(56) References Cited

U.S. PATENT DOCUMENTS

| | | | | |
|---|---|---|---|---|
| 6,491,373 | B1 * | 12/2002 | Fujita et al. | 347/15 |
| 6,601,939 | B2 * | 8/2003 | Fujita et al. | 347/15 |
| 6,963,423 | B2 * | 11/2005 | Ogasahara et al. | 358/1.8 |
| 7,070,346 | B2 * | 7/2006 | Fujimori | 347/14 |
| 7,198,347 | B2 * | 4/2007 | Tayuki | 347/15 |
| 7,252,356 | B2 * | 8/2007 | Ide et al. | 347/12 |
| 2006/0044334 | A1 * | 3/2006 | Fujita et al. | 347/12 |
| 2008/0284805 | A1 * | 11/2008 | Kiuchi et al. | 347/9 |
| 2011/0227982 | A1 * | 9/2011 | Marumoto et al. | 347/14 |

* cited by examiner

FOREIGN PATENT DOCUMENTS

| | | |
|---|---|---|
| JP | 7-117241 | 5/1995 |
| JP | 2002-36515 | 2/2002 |

*Primary Examiner* — Scott A Rogers
(74) *Attorney, Agent, or Firm* — Wenderoth, Lind & Ponack, L.L.P.

(57) ABSTRACT

The present invention is intended to prevent appearance of streaks in head scanning direction at the joint of print data of the image to be printed. Print data composed of a multiplicity of dot information is supplied to a printing head having a plurality of dot forming elements arrayed along a sub-scanning direction. The printing head and the printing medium relatively move in main scanning direction and sub-scanning direction each other, and an image is printed on the surface of the printing medium. In the print data supplied by every main scanning action of the printing head, a deformed data portion of concave and convex shapes of waveform are formed, for example, so that dots may not be arrayed in parallel continuously in the main scanning direction of the printing head, at the joint of the ends of the sub-scanning direction. The undulation profile of this waveform is set in an ambiguous state, and the ambiguous state of the profile is not a state of a continuous profile line when the printed profile is observed visually.

23 Claims, 30 Drawing Sheets

Second printing

Seventh printing

Print data deformation example

How to make additional print data

Forth printing

Fifth printing(repeated portion)

Sixth printing (end of data)

Eighth printing

Ninth printing(end of printing)

Other basic mask pattern

Exampe of mask pattern (A)

To change in concentration (printing rate)
(head scanning direction)

Example of print result using patterns of a and c (A) Print result by head 1, 3, 5

(B) Print result by head 2, 4, 6

(C) Print result

APPARATUS AND METHOD THAT REDUCES STREAKING BY USING A DEFORMED DATA PORTION TO NOT ARRAY DOTS CONTINUOUSLY IN THE MAIN SCAN DIRECTION OF THE PRINT HEAD IN THE END PORTIONS OF THE SUB-SCAN DIRECTION

TECHNICAL FIELD

The present invention relates to a printer and a printing method of a system of moving a head in a scanning system in an ink jet printer for printing an image on the surface of a printing medium by supplying print data composed of a multiplicity of dot information to a printing head having a plurality of dot forming elements arrayed in a sub-scanning direction, and moving the printing head and a printing medium relatively in a main scanning direction and a sub-scanning direction.

TECHNICAL BACKGROUND

To make printing unevenness at joint portions less obvious in a printing apparatus, it has been proposed to complicate the printing positions (refer to, for example, patent document 1). Or to reduce concentration unevenness of black streak or the like, a method of controlling the quantity of ink is known (refer to, for example, patent document 2). Other ink jet recording apparatus is known for suppressing decline of image quality due to joining streaks in the boundary of a band and other band by a process of decimating dots or printing in duplicate (refer to, for example, patent document 3). Further, to make joints less obvious, a recording method is known to duplicate lines, and to record the recording density of the duplicate lines at a lower density than other non-duplicate lines (refer to, for example, patent document 4). Other printer is known to prevent banding by printing obliquely (refer to, for example, patent document 5).

Patent document 1: Japanese Unexamined Patent Application Publication No. 2003-34017
Patent document 2: Japanese Unexamined Patent Application Publication No. 2002-200745
Patent document 3: Japanese Unexamined Patent Application Publication No. 2000-238935
Patent document 4: Japanese Unexamined Patent Application Publication No. H09-99550
Patent document 5: Japanese Unexamined Patent Application Publication No. 2000-52595

DISCLOSURE OF THE INVENTION

Problem to be Solved by the Invention

Streak-like phenomenon in the scanning direction of the head seems to be caused by complicated factors including transfer precision of paper of the printing apparatus, mechanical error, deviation of mounting position of the head, deviation of printing position of the ink discharged from the head, and problems of print data. However, considering that the streaks appear in the scanning direction of the head, a major factor seems to be related to the operation of the printing head which moves in the scanning direction of the head after the paper is delivered and prints for a certain printing width. Or, depending on the printing head, when the ink discharge nozzle discharges the ink continuously, if multiple nozzles are discharging in parallel among multiple nozzles and printing nozzles, the precision of the printing position of the nozzles positioned at ends may not be satisfactory. Although the ink discharge control is the same between the nozzles at ends and other nozzles, the precision of the position of the ink discharged from the nozzles at ends may not be sufficiently achieved, and errors may be linked in the lateral direction, and streaks may be caused.

It is hence an object of the present invention to make streaks in the scanning direction of the head less obvious by preventing the streak-like phenomenon in the scanning direction of the head in parallel in the scanning direction in the joint portion even if the printing head is moved in the scanning direction.

Means for Solving Problem

To achieve the object, the present invention provides a printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, in which a deformed data portion is formed so that dots may not be arrayed continuously in the main scanning direction of the printing head in the end portions of the sub-scanning direction of the print data supplied in every main scanning operation of the printing head, and the profile of the end portions of the sub-scanning direction of the print data in the deformed data portion is set in an ambiguous state, and the ambiguous state of the profile is not in a state of a continuous profile line, when the printed profile is visually observed.

The present invention also provides a printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, in which a deformed data portion having concave and convex parts not arraying dots continuously in the main scanning direction of the printing head at the end portion is formed at the end portion side in the sub-scanning direction of the main data portion of the print data supplied in every main scanning operation of the printing head, the deformed data portion is composed of an outside region and an inside region divided from the profile of the concave and convex parts, and the outside region is a region for masking the print dot information, and the inside region is a region for printing the print dot information, the profile of the concave and convex parts is set in an ambiguous state, and the ambiguous state of the profile is not in a state of a continuous profile line, when the printed profile is visually observed, and thereby the printing rate of the inside region of the deformed data portion is changed.

The present invention also provides a printing apparatus for moving a printing head and a printing medium relatively in a main scanning direction and a sub-scanning direction, supplying print data composed of a multiplicity of dot information on the printing head having a plurality of dot forming elements arrayed in parallel rows so as to overlap in the main scanning direction each along the sub-scanning direction, and printing an image on the surface of the printing medium, including deformed data generating means for generating a deformed data portion by forming concave and convex parts in the end portion of sub-scanning direction of the print data supplied to each printing head, so that the dots in the end portion of the print data may not be arrayed continuously in the main scanning direction of the printing head, and setting the profile of the end portion of the sub-scanning direction of the concave and convex parts in an ambiguous state, and keeping the ambiguous state of the profile not in a state of a continuous profile line, when the printed profile is visually observed, in which the deformed data generating means generates the deformed data portion deviated in the phase of the concave and convex parts, and supplies the print data having the deformed data portion deviated in the phase of the concave and convex parts to the plurality of printing heads, and the deformed data portion deviated in the phase of the concave and convex parts is overlapped and printed by the plurality of printing heads.

The present invention also provides a printing apparatus for moving a printing head and a printing medium relatively in a main scanning direction and a sub-scanning direction, supplying print data composed of a multiplicity of dot information on the printing head having a plurality of dot forming elements arrayed along the sub-scanning direction, and printing an image on the surface of the printing medium, including a plurality of printing heads arrayed in parallel rows to be overlapped in the main scanning direction, deformed data generating means for generating a deformed data portion by forming concave and convex parts in the end portion of the sub-scanning direction of the print data supplied to the printing head by the selected mask pattern data by selecting one of a plurality of mask pattern data mutually deviated in phase, so that the dots may not be arrayed continuously in the main scanning direction of the printing head, and setting the profile of the end portion of the sub-scanning direction of the concave and convex parts in an ambiguous state, and keeping the ambiguous state of the profile not in a state of a continuous line, when the printed profile is visually observed, and means for supplying print data having the deformed data portion deviated in the phase of the concave and convex parts to the plurality of printing heads, and overlapping and printing the deformed data portion deviated in the phase of the concave and convex parts by the plurality of printing heads.

In the present invention, the deformed data portion is composed of an outside region and an inside region divided from the profile, and the outside region is a region for masking the print dot information, and the inside region is a region for printing the print dot information, a profile ambiguous state generating region in which the print dot information is decimated is provided in the portion of the profile of the inside region, and an ambiguous state of the profile is generated.

In the present invention, the dot array of the profile of the deformed data portion has a shape of a waveform.

In the present invention, at right and left sides of the crest portion of the profile of the deformed data portion, the printing density is high in the lower part and the printing density is low in the upper part, and the printing density higher portion is extended upward as nearing the middle, and the profile is set in an ambiguous state by the change in the printing density. Also in the present invention, printing of the image is completed sequentially in a unit of N times (N being an integer) of scanning of the printing head on the printing medium, and the print data of the image having the deformed data portion is supplied to the printing head.

In the present invention, the deformed data portion is formed at the rear end portion of the sub-scanning direction of the print data including the ends of image among the print data supplied in every scanning on the printing head, the deformed data portion is formed at the front end portion and rear end portion of the sub-scanning direction of the print data of the intermediate portion of the image, and the deformed data portion is formed at the front end portion of the sub-scanning direction of the print data including the rear end portion of the image.

In the present invention, complementary data is created for complementing the dot data deleted from the deformed data portion, and the deleted dot data of the deformed data portion is complemented by the complementary data.

In the present invention, the printing rate in the inside region of the deformed data portion is changed in the sub-scanning direction.

In the present invention, the printing rate in the inside region of the deformed data portion is changed in the main scanning direction.

In the present invention, the printing rate of the deformed data portion is changed both in the main scanning direction and in the sub-scanning direction.

In the present invention, a region of 100% printing rate is provided in the deformed data portion at the side contacting with the main data portion, and the region of 100% printing rate and a region changed in the printing rate of the deformed data portion contact with each other in concave and convex profile.

In the present invention, printing of the image is completed sequentially in a unit of N times (N being an integer) of scanning of the printing head on the printing medium, and the print data of the image having the deformed data portion changed in the printing rate, and the print data having the complementary data, and/or the print data having both the deformed data portion and complementary data are supplied to the printing head.

In the present invention, among the print data supplied in the printing head in every scanning, the deformed data portion is formed at the rear end portion of the sub-scanning direction of the print data including the leading end of the image, the deformed data portion is formed at the rear end portion of the sub-scanning direction of the print data in the intermediate portion of the image, and at the front end portion, complementary data for complementing the deformed data portion of the print data adjacent hereto is generated, and complementary data for complementing the deformed data portion of the print data adjacent thereto is generated at the front end portion of the sub-scanning direction of the print data including the rear end of the image.

In the present invention, a region changed in the printing rate forming the concave and convex parts is provided in the deformed data portion, a region of 100% printing rate is provided at the side contacting with the main data portion of the print data, and the region of 100% printing rate and the region changed in the printing rate of the deformed data portion contact with each other in concave and convex profile.

The present invention provides a printing method for printing on a printing medium by moving the printing head sequentially in a main scanning direction and delivering the printing medium in a sub-scanning direction in a print unit of print data of n (n being an integer) lines, in which lines at the end portion of the joint side repeat a concave and convex profile so that a specified number of lines at the joint side of the print data may not be arrayed continuously in the main scanning direction, and that the profile at the end portion of the sub-scanning direction of the concave and convex parts may be set in an ambiguous state, and that the ambiguous state may be free from apparent continuous profile lines when the printed profile is observed visually.

The present invention provides a printing method for printing on a printing medium by moving the printing head sequentially in a main scanning direction and delivering the printing medium in a sub-scanning direction in a print unit of print data of n (n being an integer) lines, in which lines at the end portion of the joint side repeat a concave and convex profile so that a specified number of lines at the joint side of the print data may not be arrayed continuously in the main scanning direction, and that the profile at the end portion of the sub-scanning direction of the concave and convex parts may be set in an ambiguous state, and that the ambiguous state may be free from apparent continuous profile lines when the printed profile is observed visually, and the printing rate in a specified range near the joint side is changed.

The present invention provides a printing method for printing on a printing medium by supplying print data of n (n being an integer) lines sequentially as a printing unit on a plurality of printing heads arrayed in parallel so as to be overlapped in a main scanning direction, moving the printing heads in the main scanning direction and delivering a printing medium in a sub-scanning direction, in which concave and convex parts are formed in the data of end portion of the sub-scanning direction of the print data supplied to each printing head so that the dots may not be arrayed continuously in the main scanning direction of the printing head, and the profile of the end portion of the sub-scanning direction of the concave and convex parts is set in an ambiguous state, and the ambiguous state is formed to generate the deformed data portion not obvious in a continuous profile line, when the printed profile is visually observed, and print data having the deformed data portion deviated in the phase of the concave and convex parts is supplied to the plurality of printing heads, and the deformed data portion deviated in the phase of the concave and convex parts is overlapped and printed by the plurality of printing heads.

The present invention provides a printing method for printing on a printing medium by supplying print data of n (n being an integer) lines sequentially as a printing unit on a plurality of printing heads arrayed in parallel so as to be overlapped in a main scanning direction, moving the printing heads in the main scanning direction and delivering a printing medium in a sub-scanning direction, in which a plurality of mask pattern data are generated by deviating the phase of a basic mask pattern, concave and convex parts are provided at the end portion of the sub-scanning direction of the main data portion of the print data supplied to each printing head so that the dots may not be arrayed continuously in the main scanning direction, and the profile of the end portion of the sub-scanning direction of the concave and convex parts is set in an ambiguous state, and the ambiguous state is formed to generate the deformed data portion not obvious in a continuous profile line, when the printed profile is visually observed, the deformed data portion deviated in the phase of the concave and convex parts is supplied to the plurality of printing heads, and the deformed data portion deviated in the phase of the concave and convex parts is overlapped and printed by the plurality of printing heads.

In the present invention, the shape of the concave and convex parts is formed by deleting the dot information at the joint side of the print data by the mask pattern, and the deleted dot information is complemented by the concave and convex profile of the print data to be printed in a later scanning.

In the present invention, the complementary data of the deleted dot information is created by inverting the mask pattern.

Effects of the Invention

The present invention provides a printing apparatus of a system for moving a printing head in a scanning direction, in which stream-like phenomenon appearing in the head scanning direction is easily made less obvious in the print result only by changing the data.

Figure 1:
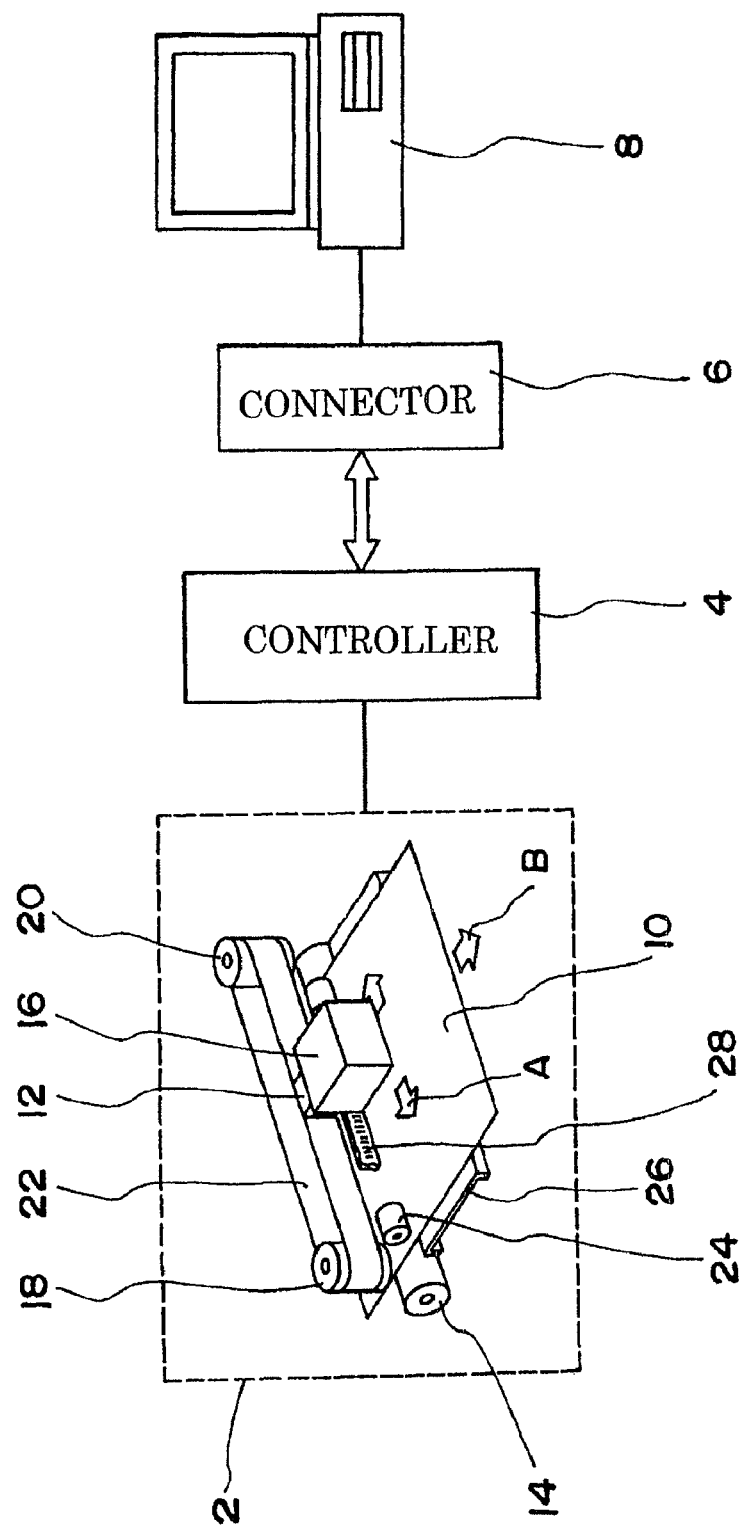
FIG. 1 is an overall outline block diagram of a printing apparatus.

| Description of the Reference Numerals ||
| --- | --- |
| 2: | Printer; |
| 4: | Controller; |
| 6: | Connector; |
| 8: | Computer; |
| 10: | Printing medium; |
| 12: | Carriage; |
| 14: | Drive roller; |
| 16: | Printing unit; |
| 18: | Belt drive roller; |

-continued

Description of the Reference Numerals

| | |
|---|---|
| 20: | Belt drive roller; |
| 22: | Belt; |
| 24: | Pinch roller; |
| 26: | Platen; |
| 28: | Linear scale; |
| 30: | Printing head; |
| 32: | Nozzle; |
| 34: | Rear end portion; |
| 36: | Deformed data portion; |
| 38: | Basic mask pattern; |
| 40: | Data; |
| 42: | Partial portion; |
| 44: | Front end portion; |
| 46: | Front end portion; |
| 48: | Rear end portion; |
| 50: | Region; |
| 52: | Deletion portion; and |
| 54: | Region |

THE BEST MODE FOR CARRYING OUT THE CLAIMED INVENTION

The present invention is specifically described below while referring to the accompanying drawings.

FIG. 1 shows an overall outline view of a printing apparatus of the present invention. An ink jet printer 2 is controlled by a controller 4 including a computer circuit, and the controller 4 is connected to an external computer 8 by way of a connector 6. The controller 4 stores a program for converting the front and rear end portions of conveying direction of print data. The computer 8 transmits print data to the controller 4 mounted on the printer 2. The controller 4 analyzes the received data as described below, and controls the drive unit of the printer 2. The printer 2 includes a sub-scanning feed mechanism for conveying printing medium 10 including roll paper by means of a paper feed motor in the direction of arrow B, and a main scanning feed mechanism for moving a carriage 12 reciprocally in the axial direction of a drive roller 14 by means of a carriage motor.

The feed direction B of the printing medium 10 by the sub-scanning feed mechanism is called a sub-scanning direction, and the moving direction A of the carriage 12 by the main scanning feed mechanism is called a main scanning direction. The term "printing" is not limited to writing of a character, but is used in a wide sense of meaning including printing of images and symbols. The carriage 12 is provided with a printing unit 16 having a plurality of printing heads. The carriage 12 is driven reciprocally in the main scanning direction A along the Y-axis rail (not shown) by a head driving belt 22 applied between belt driving rollers 18, 20. The printing medium 10 is driven in the sub-scanning direction by means of the drive roller 14 and a pinch roller 24, and slides on a platen 26. The printing medium 10 is ordinary roll paper. The position of the carriage 12 is detected by a timing fence signal from a linear encoder composed of sensor provided in the printing unit 16 and a linear scale 28 provided oppositely thereto.

In this configuration, when the printing action starts, by the control by the controller 4, the carriage 12 is driven reciprocally in the main scanning direction along the Y-axis rail, and ink drops are discharged from the nozzles of the printing head mounted on the printing unit 16. When the printing unit 16 reaches the terminal end in the main scanning direction, the controller 4 moves the printing medium 10 by a specified pitch in the sub-scanning direction, and executes next printing action in the main scanning direction. The printer 2, controller 4, and computer 8 are combined to make up a printing apparatus on the whole.

Figure 2:
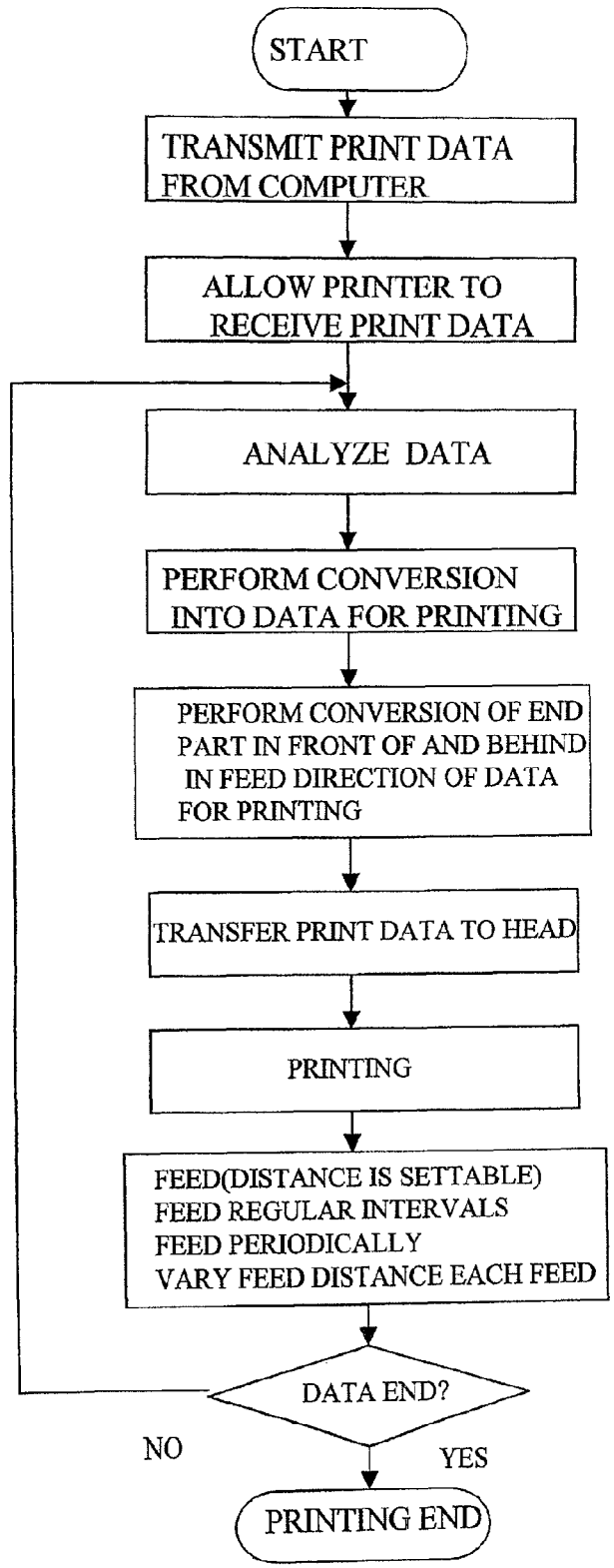
FIG. 2 is a flowchart showing operation of the present invention.
Figure 3:
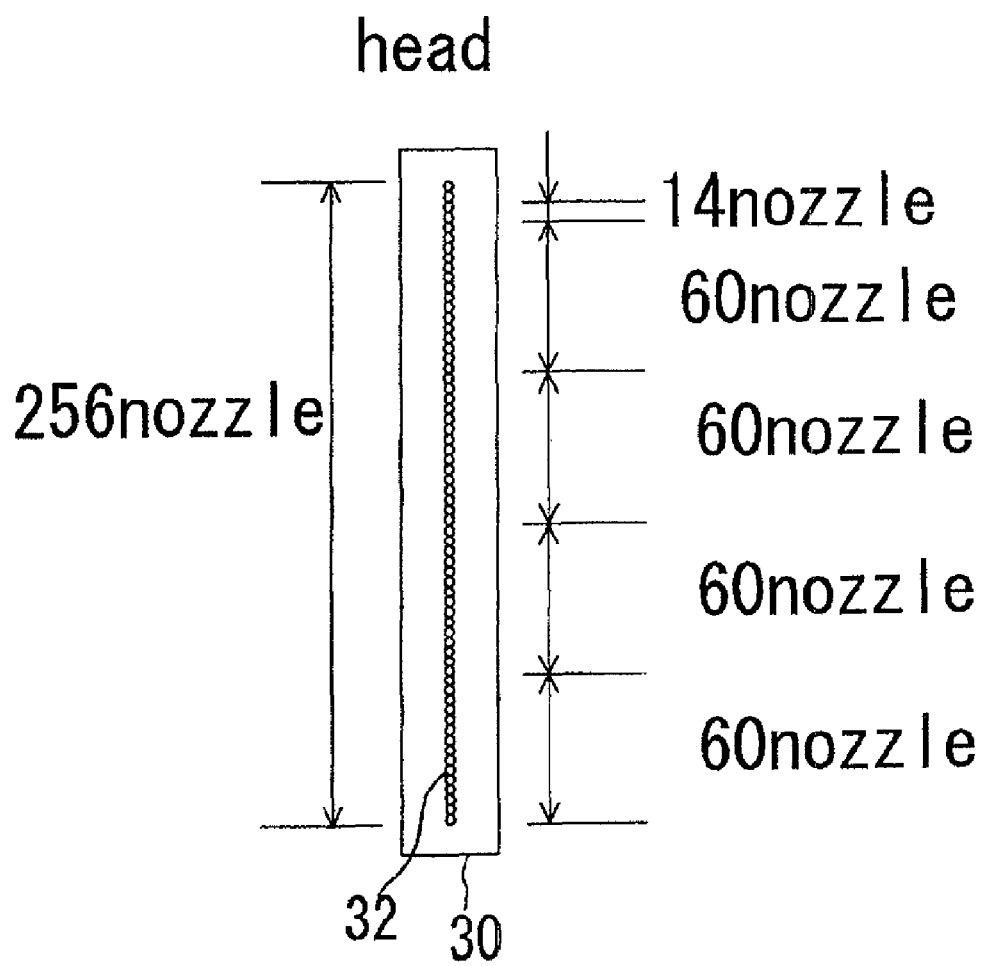
FIG. 3 is an explanatory diagram of a printing head.

Referring now to FIG. 2, the printing operation of the printing apparatus of the present invention is described below. The computer 8 creates print data to be printed out, such as sign characters, graphics, patterns and images. The printed data created in the computer 8 is transferred to the controller 4 by way of the connector 6 (steps 1, 2). The controller 4 receives the print data from the computer 8 according to the program stored in the memory, and analyzes the print data (step 3). A CMYK conversion unit of the controller 4 converts the colors of images into ink colors that can be printed by the printer 2. Consequently, the print data is converted into data for printing corresponding to the ink jet printing head (step 4). FIG. 3 shows a printing head 30.

The printing unit 16 includes a plurality of printing heads for discharging inks of corresponding colors, black (B), cyan (C), magenta (M), and yellow (Y). For the ease of explanation, herein, only one printing head 30 of the plurality of printing heads is explained. The configuration and operation of the other printing heads are same as in the printing head 30 described below. In the preferred embodiment, the printing head 30 has a total of 256 nozzles 32 arrayed in the sub-scanning direction. In the drawing, all nozzles are not shown because of the limited space. Of course, the resolution of the printing head 30 is not particularly specified, and the number of nozzles is not limited to 256. Among 256 nozzles, for example, when desired to complete printing in four times of scanning, if one paper transfer distance is the portion of 60 nozzles, the portion of 240 nozzles corresponding to four times of 60 nozzles, and the portion of 14 nozzles for printing the end portion data are assigned as nozzles, and the printing is operated by using the total of 254 nozzles. Hence, the remaining two nozzles are not used. The number of nozzles to be used, the transfer distance, and the number of times of scanning may be changed as required.

Figure 5:
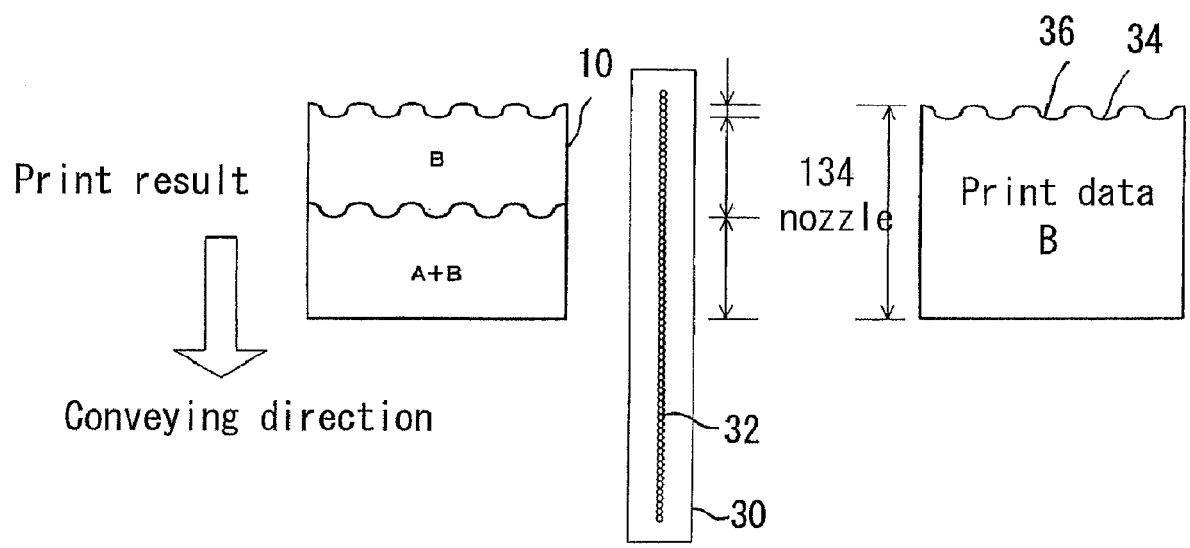
FIG. 5 is an explanatory diagram of the present invention.
Figure 6:
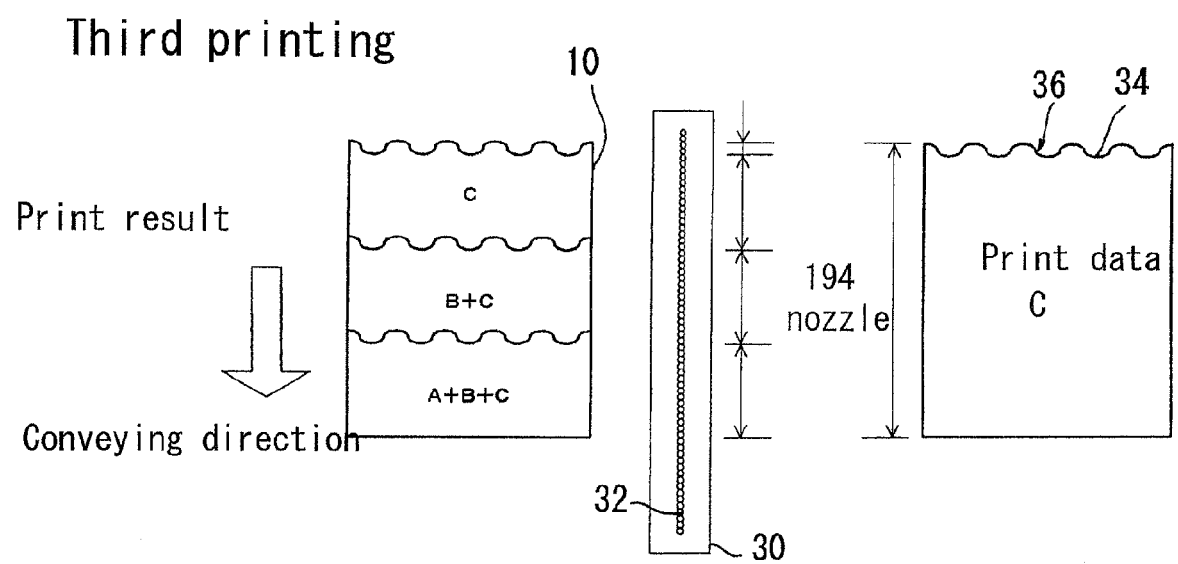
FIG. 6 is an explanatory diagram of the present invention.
Figure 7:
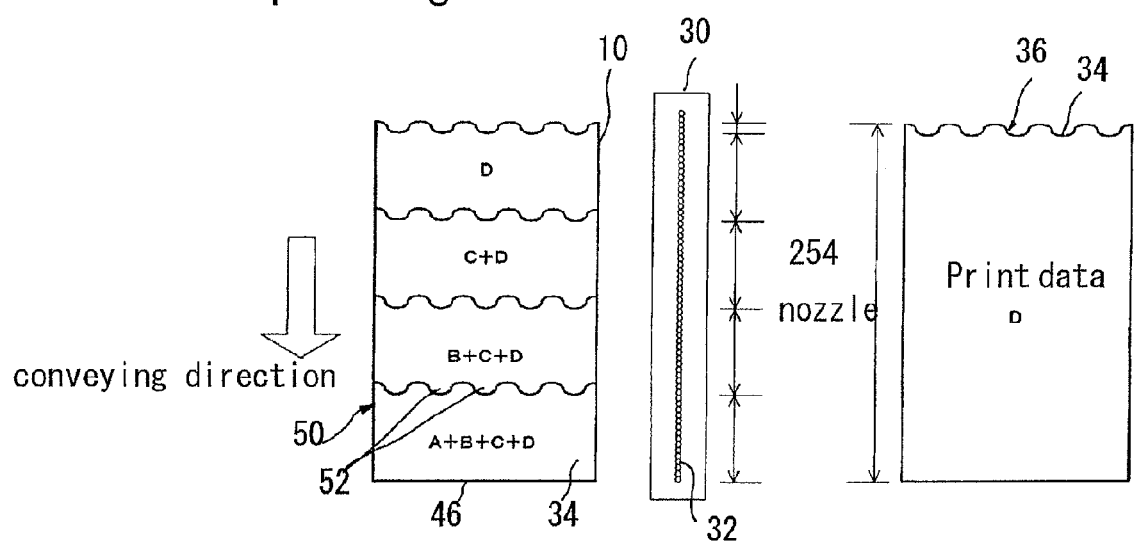
FIG. 7 is an explanatory diagram of the present invention.

FIG. 4 to FIG. 7 disclose print data A, B, C, D corresponding to initial four times of scanning of the printing head 30. As shown in FIG. 7, by four times of scanning by the printing head 30, printing of the image corresponding to a scanning region 33 of the portion of 60 nozzles is completed. The print data A corresponds to the portion of 74 nozzles of the printing head in the size in the sub-scanning direction of the data, and on the basis of the conveying direction of the printing medium 10, a deformed data portion 36 of waveform of the portion of 14 nozzles is formed at a rear end portion 34 (joint) of the main data portion. This deformed data portion 36 is formed at all rear end portions 34 (joints) of print data A, B, C, D.

Figure 13:
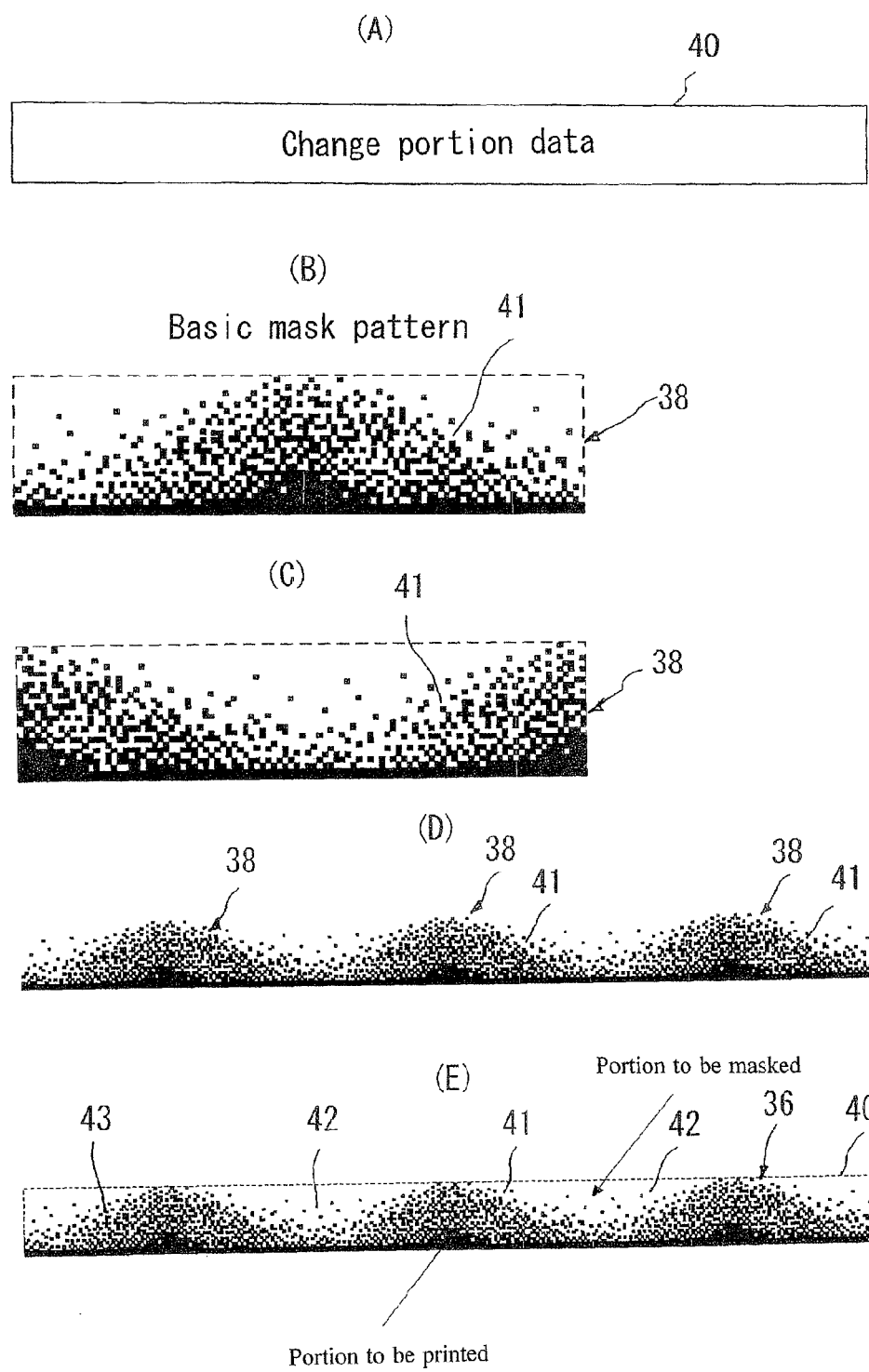
FIG. 13 is an explanatory diagram of the present invention.
Figure 14:
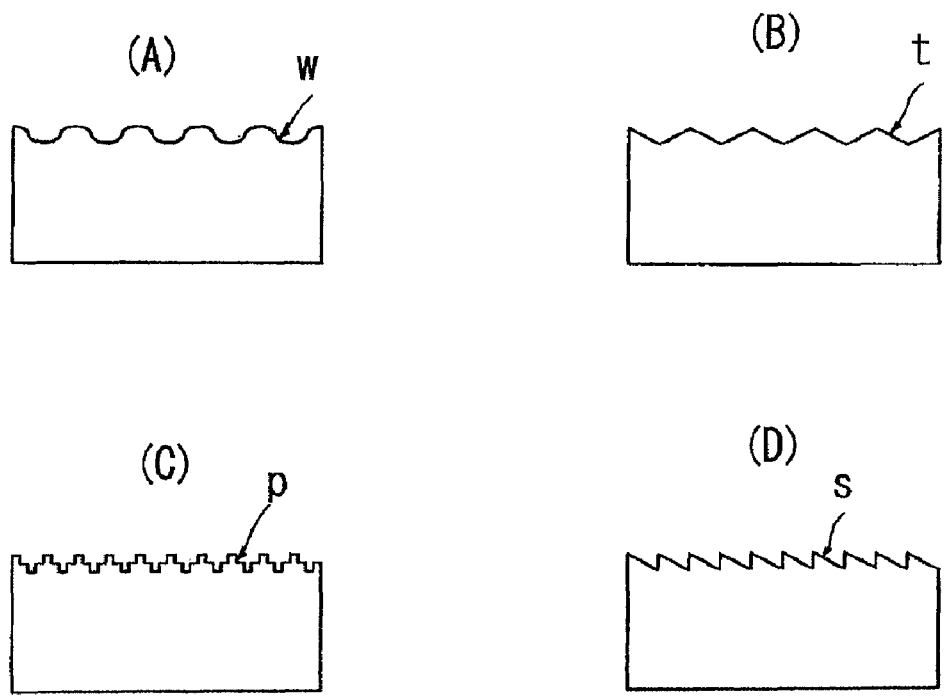
FIG. 14 is an explanatory diagram of the present invention.

FIG. 13 shows a generating method of deformed data portion 36. The controller 6 preliminarily stores a basic mask pattern 38 for creating the deformed data portion in the memory. The basic mask pattern 38 is, in the preferred embodiment, a waveform, and includes any undulated shapes shown in FIG. 14, such as waveform pattern (w), triangular wave pattern (t), protruding pattern (p), sawtooth pattern (s), and any other pattern of dots not arrayed continuously in the main scanning direction. The height and length of the waveform pattern may be set freely as required, and are not limited to the illustrated examples. Besides, multiple waveform patterns may be prepared, and a proper one may be selected according to the desired printing resolution. The basic mask pattern 38 shown in FIGS. 13 (B) and (C) is composed of dot (bit) information of ON (print) and OFF (delete), and the ON dot is shown in black, and the OFF dot is shown in white (colorless). The basic mask pattern 38 in FIG. 13 (C) is generated by deviating the phase of the basic mask pattern in FIG. 13 (B) by 90 degrees, and the waveform shape of an inverted pattern is formed. The OFF dot is to delete the dot of print data, and the ON dot is for printing the dot of print data directly. To generate a deformed data portion 36 in print data A, a logical product is calculated between data 40 of the portion of the width of 14 nozzles adjacent to the rear end portion of the main data portion of the print data A, and the basic mask pattern 38 developed repeatedly in the main scanning direction, and dots are deleted or decimated from the data 40, and an ambiguous profile state generating portion 43 in ambiguous state of a wave-shaped profile 41 is generated in the deformed data portion 36.

In the preferred embodiment, as shown in FIGS. 13 (B) and (C), at right and left sides of the crest portion, the ON dot density is set high in the lower part and the ON dot density is set low in the upper part, and the ON dot density higher portion is extended upward as nearing the middle. In the deformed data portion 36 generated by this basic mask pattern 38, as shown in FIG. 13 (E), at right and left sides of the crest portion, the printing density is set high in the lower part and the printing density is set low in the upper part, and the printing density higher portion is extended upward as nearing the middle. The outside region of the crest-like profile 41 composes a mask portion 42, and print dots are also scattered and generated in this mask portion. By change in the printing density, the profile 41 of the wave-shaped concave and convex profile of the deformed data portion 36 is set in an ambiguous state. This ambiguous state of the profile does not appear as a continuous profile line of wave-shaped profile in this deformed data portion 36 when the printed deformed data portion 36 is visually observed, and this is the state shown in FIG. 13 (E), and the dot pattern generating such ambiguous state is obtained experimentally on the basis of the visual impression. Thus, since the profile 41 of the deformed data portion 36 is set in an ambiguous state, generation of lateral streaks can be effectively prevented at the time of printing. The basic mask pattern 38 for making ambiguous the profile 41 of the deformed data portion 36 is available in various dot patterns, and is not particularly limited to the examples shown in FIGS. 13 (B) and (C).

Figure 8:
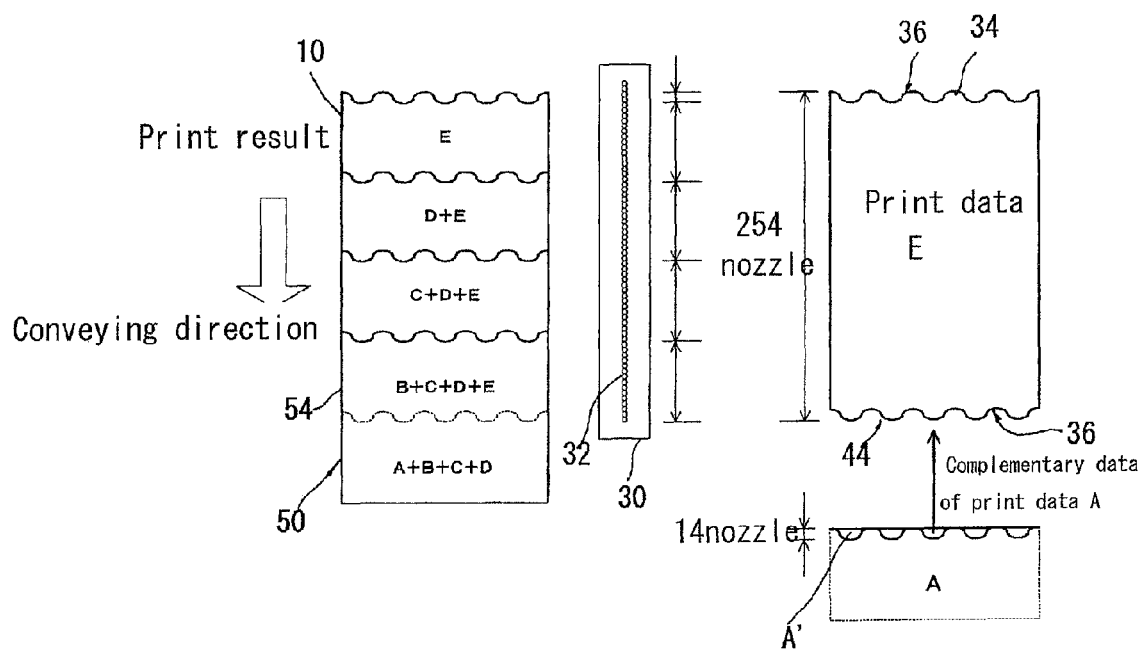
FIG. 8 is an explanatory diagram of the present invention.

In the change portion 40 of the print data A, a portion 42 from which dot information is deleted, or dot information decimated in the inside region of the profile 41 is stored in the memory as complementary data A' of print data A, and created, as described below, as a complementary portion at the front end portion 44 of the print data E as shown in FIG. 8, at the time of a fifth printing operation. The complementary data A' may be created in a similar procedure by inverting the black and white dots of the ON and OFF dots (bits) of the basic mask pattern 38. Among the print data, in the front end portion 46 of the original image, that is, in the print data A, B, C, D including the print starting end, deformed data portion 36 is formed in the rear end portion 34 of the conveying direction, and in the rear end portion 48 of the original image, that is, in the print data F, G, H, I including the print finishing end, the deformed data portion 36 is formed in the front end portion 44 of the conveying direction. The joint side of the print data A, B, C, D, E, F, G, H, I forming the deformed data portion 36 shows a waveform shape having an ambiguous profile.

As mentioned above, when the change process of front and rear end portions of conveying direction of print data is executed (step 5), the controller 4 transfers the print data to the printing head 30 (step 6), and the head unit 16 executes printing (step 7), and conveys the printing medium 10 (step 8), and the original image is printed on the printing medium 10. The operation at steps 7 and 8 is explained below while referring to FIG. 4 to FIG. 12.

Figure 4:
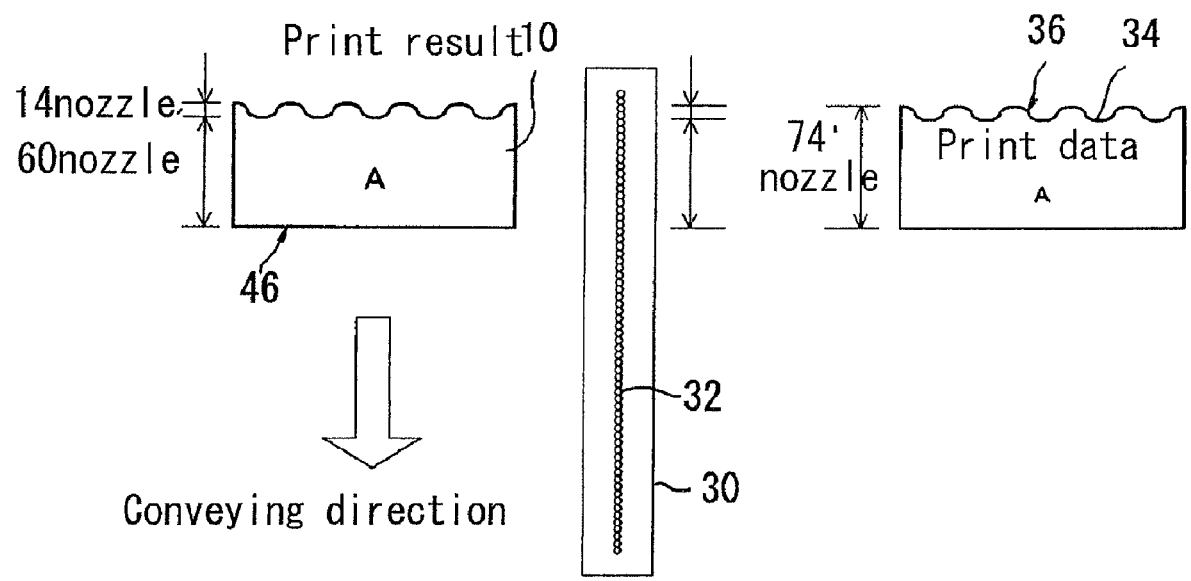
FIG. 4 is an explanatory diagram of the present invention.

FIG. 4 shows a first scanning by the printing head 30. When the printing head 30 completes a first scanning operation by its group of 74 nozzles, print data A of waveform shape at joint side is printed in the printing medium 10. The printing medium 10 is conveyed in the conveying direction by the portion of 60 nozzles. Next, as shown in FIG. 5, the printing head 30 moves in the main scanning direction, and executes a second printing, and print data B of waveform shape at joint side having a length corresponding to 134 nozzles is printed. When the second printing by the printing head 30 is completed, the printing medium 10 is conveyed in the conveying direction by the portion of 60 nozzles. Thus, third and fourth printing are operated as shown in FIGS. 6 and 7.

When the fourth printing is completed, printing of a first region 50 corresponding to the length of 60 nozzles of the printing medium 10 is completed. This region 50 corresponds to A+B+C+D shown in FIG. 7, in which scanning is done four times by print data A, B, C, D, but a deletion portion 52 of deformed data portion is printed only three times by print data B, C, D. It is therefore necessary to complement the deletion portion 52. Next, as shown in FIG. 8, the printing medium 10 is conveyed in the conveying direction by the portion of 60 nozzles, and the printing head 30 is moved in the main scanning direction to execute fifth printing, and print data E having a length of 254 nozzles in the intermediate portion of the original image is printed. At this time, the data deletion portion 52 and decimated portion of the waveform deformed portion of the first region 50 are complemented by complementary data A' of the print data A. That is, the front end portion 44 (joint side) of print data E is created as deformed data portion 36 in the complementary data A' of the print data A.

Figure 9:
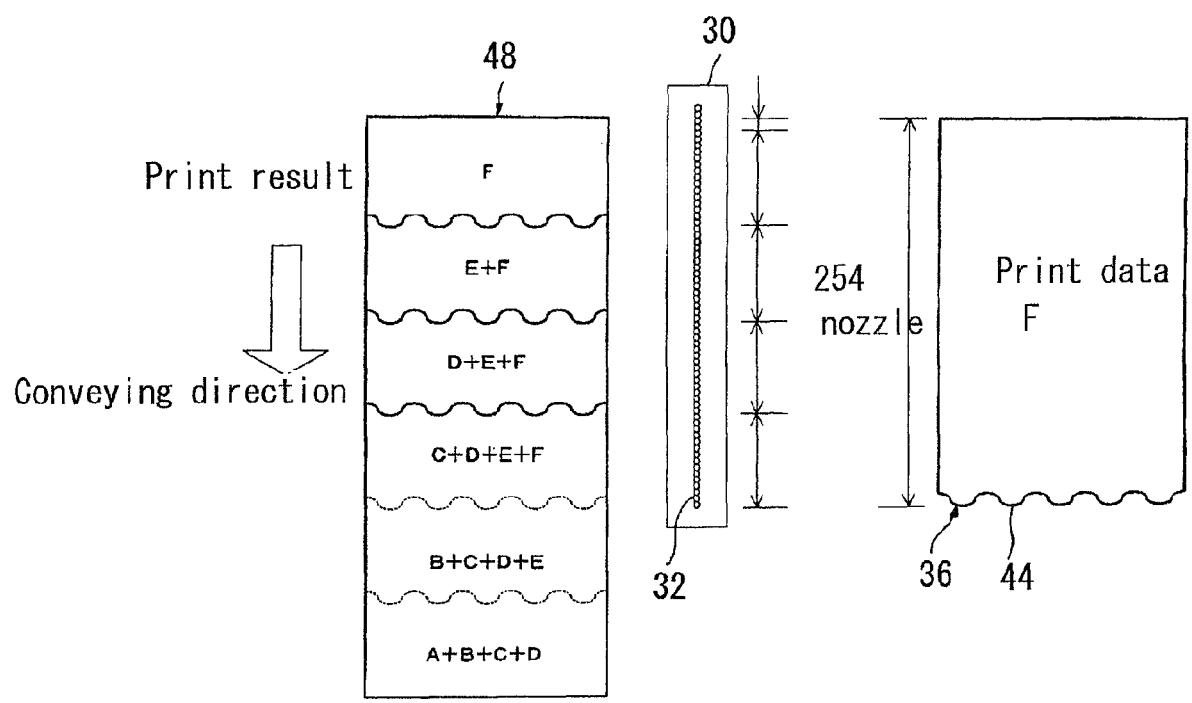
FIG. 9 is an explanatory diagram of the present invention.

The print data E having a length of 254 nozzles in the intermediate portion of one original image is created as deformed data portion 36 in the complementary data for complementing the deformed data portion of the adjacent region 50, at its front end portion 44. The waveform concave and convex shape of the deformed data portion 36 of the print data E, that is, at the joint side coincide precisely with the waveform concave and convex shapes at the joint side of the print data A. As a result, at the joint (boundary) of the first region 50 and second region 54 of the printing medium 10, lines continuously extending in the main scanning direction are not formed, and streak-like phenomenon does not appear in the scanning direction of the head. This is the same at the joints with other regions of the printing medium 10. A sixth printing is executed by print data F in the length of 254 nozzles including the rear end portion 48 of the original image as shown in FIG. 9. In the print data F, at its front end, deformed data portion 36 for complementing the deformed data portion 36 of the print data B is formed.

Figure 10:
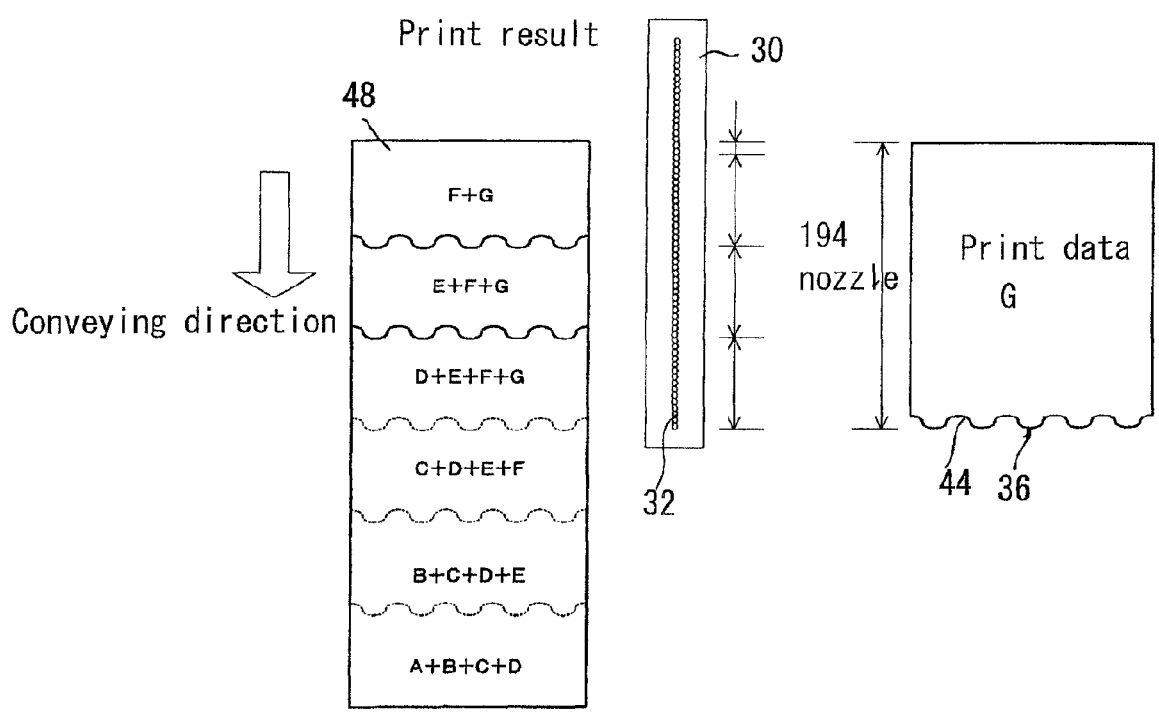
FIG. 10 is an explanatory diagram of the present invention.
Figure 11:
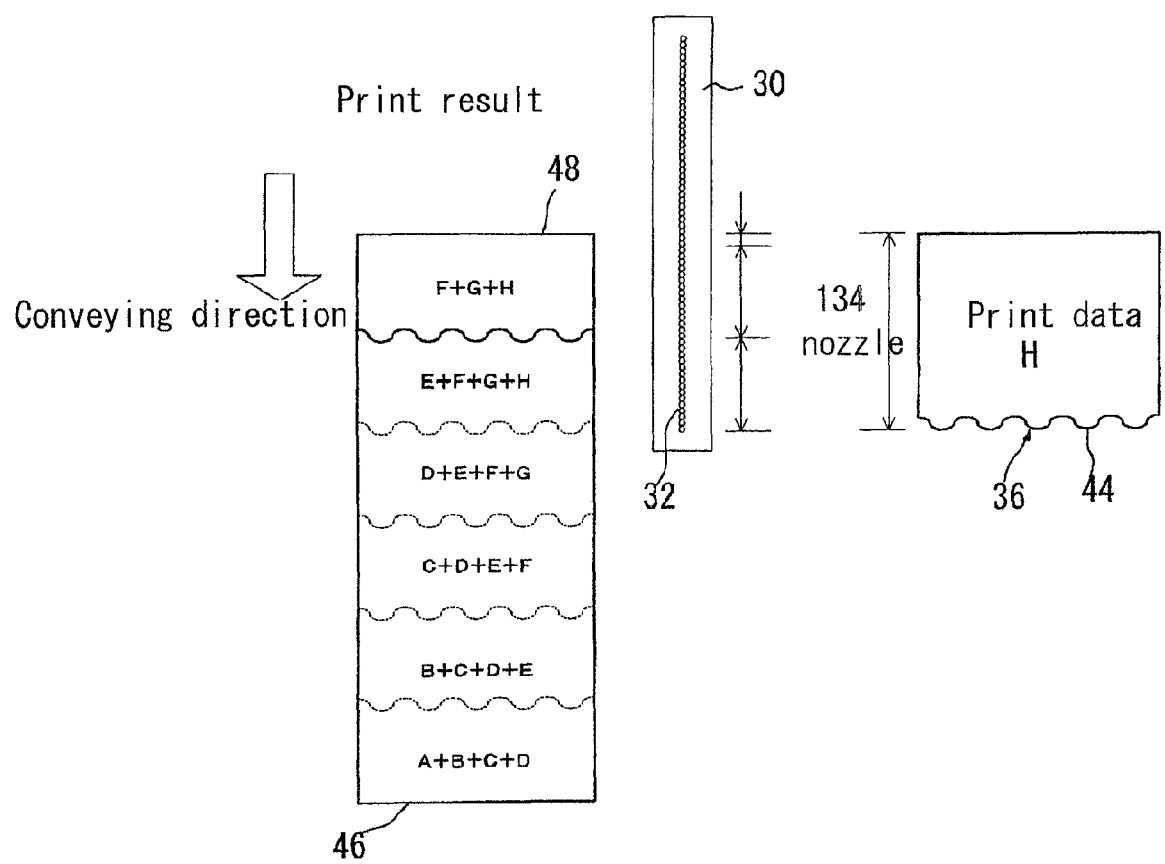
FIG. 11 is an explanatory diagram of the present invention.
Figure 12:
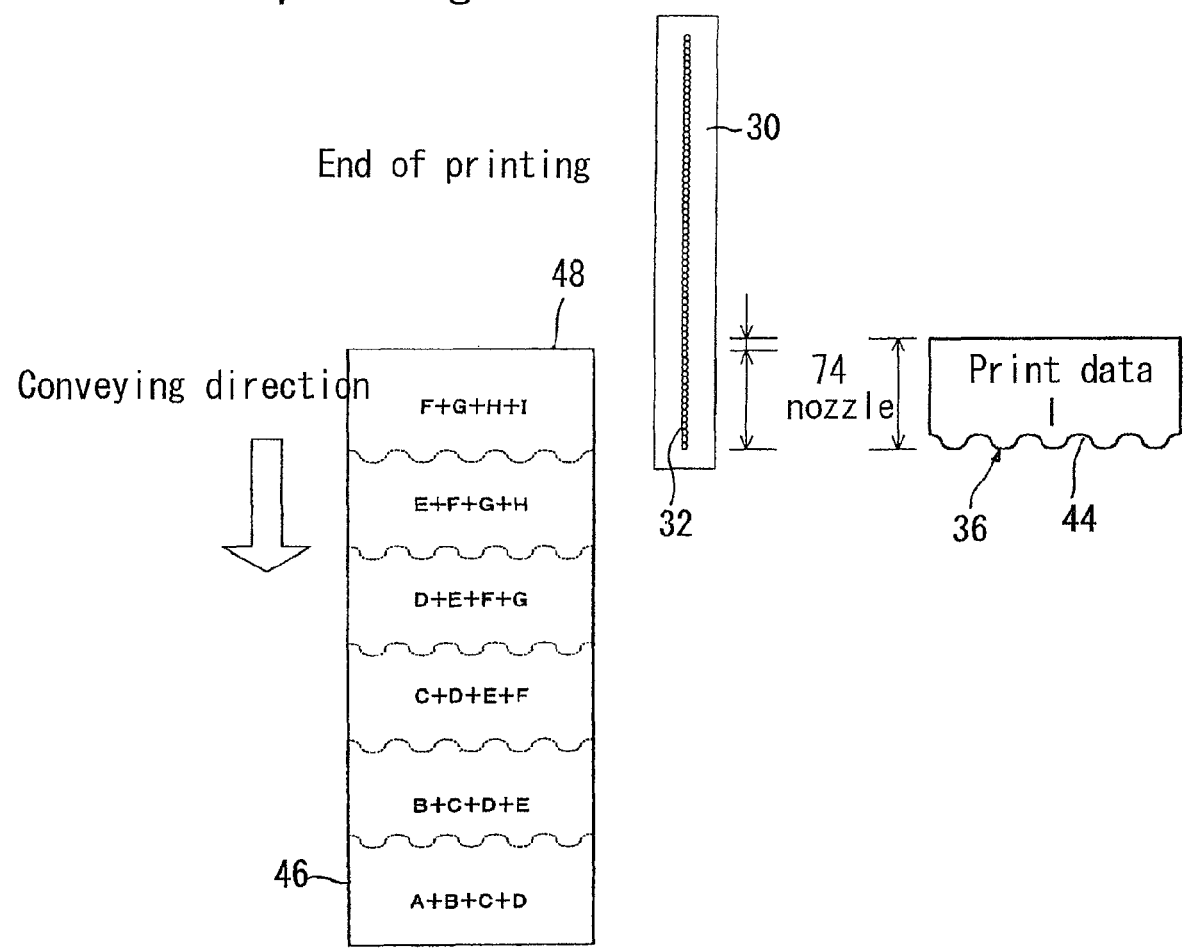
FIG. 12 is an explanatory diagram of the present invention.

The waveform concave and convex shape of the print data F at the joint side coincide precisely with the waveform concave and convex shapes of the print data B at the joint side. A seventh printing is executed by print data G in the length of 194 nozzles including the rear end portion 48 of the original image as shown in FIG. 10. In the print data G, at its front end, deformed data portion 36 for complementing the deformed data portion 36 of the print data C is formed. The waveform concave and convex shape of the print data G at the joint side coincide precisely with the waveform concave and convex shapes of the print data C at the joint side. An eighth printing is executed by print data H in the length of 134 nozzles including the rear end portion 48 of the original image as shown in FIG. 11. In the print data H, at its front end, deformed data portion 36 for complementing the deformed data portion 36 of the print data D is formed. The waveform concave and convex shape of the print data H at the joint side coincide precisely with the waveform concave and convex shapes of the print data D at the joint side.

A ninth printing is executed by print data H in the length of 74 nozzles including the rear end portion 48 (printing terminal end) of the original image. In the print data I, at its front end portion 44, deformed data portion 36 for complementing the deformed data portion 36 of the print data E is formed. The waveform concave and convex shape of the deformed data portion 36 at the joint side with the print data I coincide precisely with the waveform concave and convex shapes of the print data E at the joint side, and thereby printing of the original image is completed. In the preferred embodiment, only the concept is explained, and where the data is continuous, a portion corresponding to data E is created (step 9), and data after F is created finally.

In the preferred embodiment, the printing medium is conveyed at equal pitches of 60 nozzles each as mentioned above, but the pitches may be changed in every conveying operation. It is intended to print dots between nozzle pitches when printing at small nozzle pitches, and equal pitches are 60 nozzles, but the pitches may be changed in every conveying operation by feeding 59 nozzles or by feeding 61 nozzles. In the relation between the conveying of printing medium (paper) and scanning of printing head, printing and paper feed may be done by a going stroke of the printing head, and printing and paper feed may be done by a returning stroke of the printing head, but a same line may be printed by going stroke and returning stroke of the head, and hence the head scanning and paper feed are not limited to the illustrated methods in the preferred embodiment.

The controller 4 judges whether printing of data is complete at step 9 or not, and stops the printing if judged affirmatively. In the preferred embodiment, an ink jet printing having a head for discharging ink by using piezo elements is shown, but the present invention is not particularly limited to the ink jet printer using piezo elements, and may be also applied in the printer discharging ink by bubbles, or the printer having the head unit moving in lateral direction.

Other preferred embodiment of the present invention is described while referring to FIG. 2 and FIGS. 15 to 25. The configuration of the printing apparatus used in this preferred embodiment is same as in the printing apparatus in the first preferred embodiment shown in FIG. 1, and the printing operation is same as the flowchart shown in FIG. 2.

Figure 16:
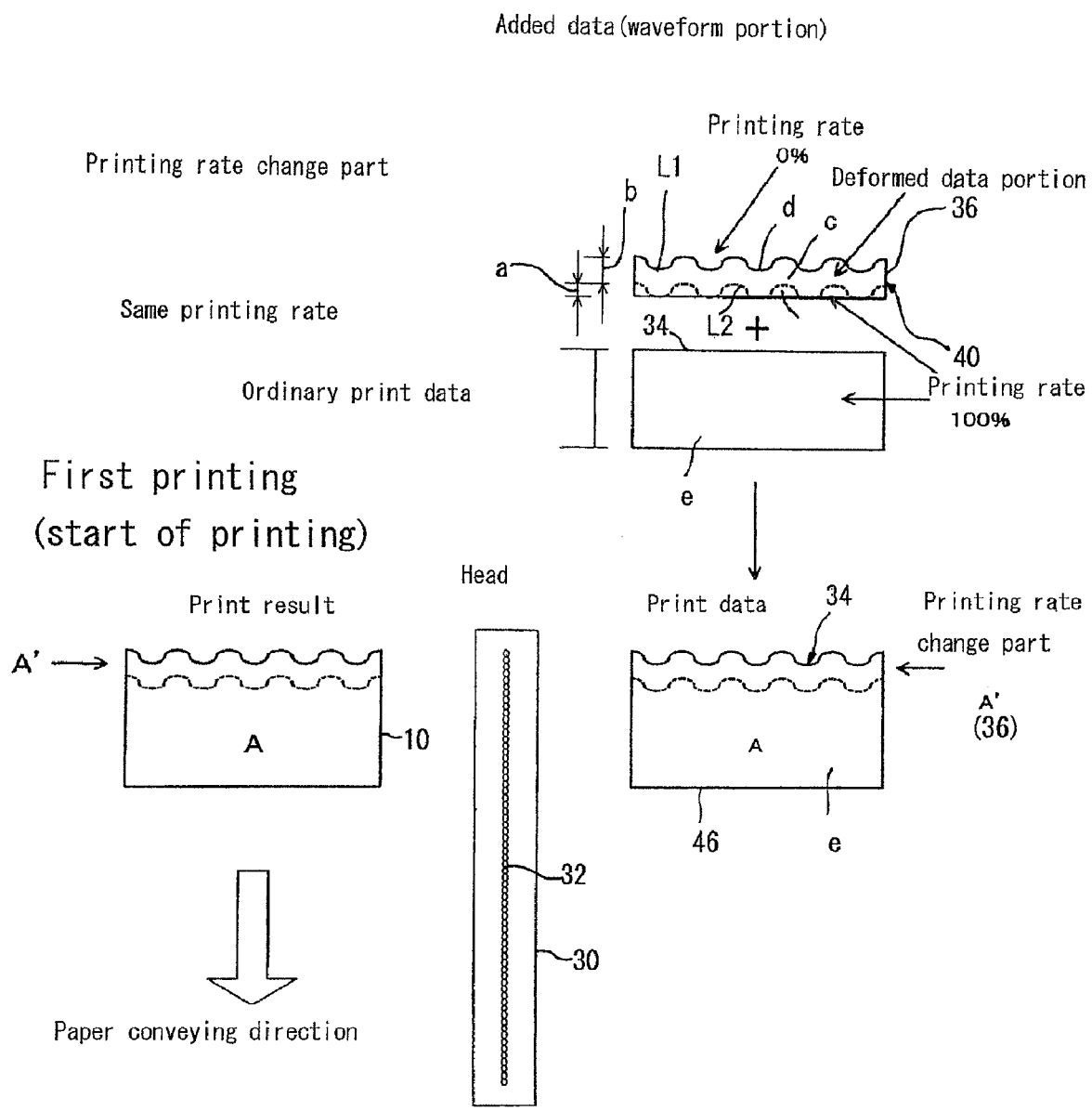
FIG. 16 is an explanatory diagram showing other embodiment of the present invention.

In this preferred embodiment, using the total of 256 nozzles of the printing head 30, if printing is completed, for example, in four times of scanning, supposing one paper conveying distance to be a length of 50 nozzles, 200 nozzles, that is, 50 nozzles times 4, and 54 nozzles for printing end portion data are assigned as nozzles used for printing, and the data is printed by using a total of 254 nozzles, and two other nozzles are not used. Of the 54 nozzles for printing the end portion data, as shown in FIG. 16, 18 nozzles are used for printing a region (a) including waveform portion (w) of 100% printing rate of deformed data portion 36 as mentioned below, and the remaining 36 nozzles are used for printing of printing rate change region (b) changed in the printing rate having concave and convex parts. The number of nozzles to be used, the conveying distance, and the number of times of scanning may be changed as desired.

Figure 17:
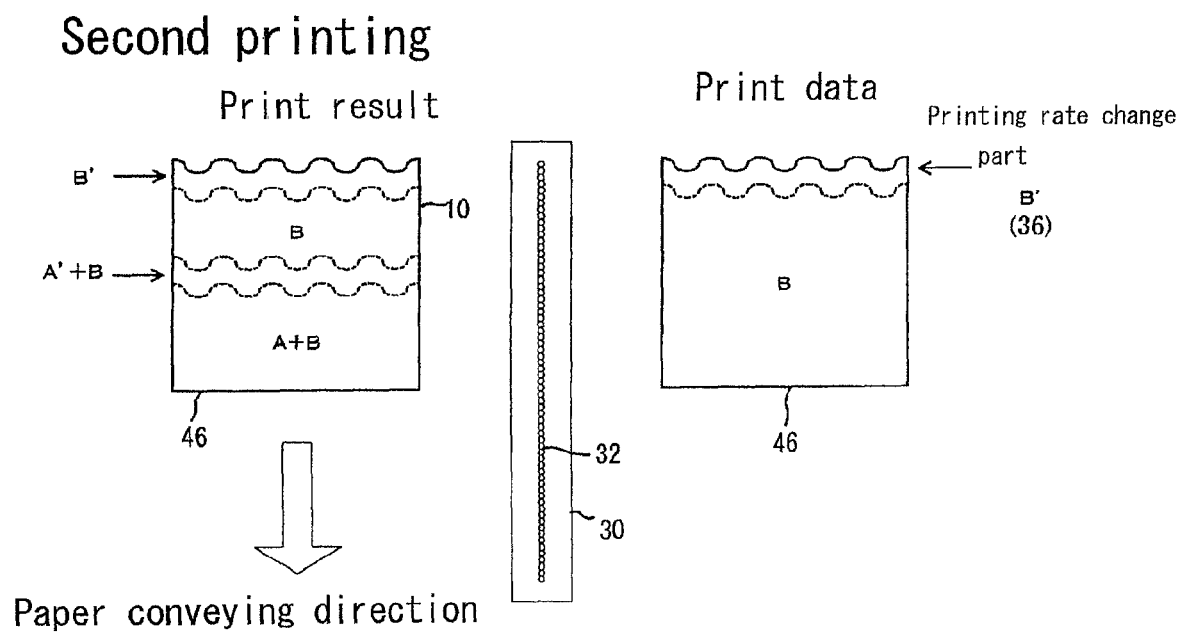
FIG. 17 is an explanatory diagram showing other embodiment of the present invention.
Figure 18:
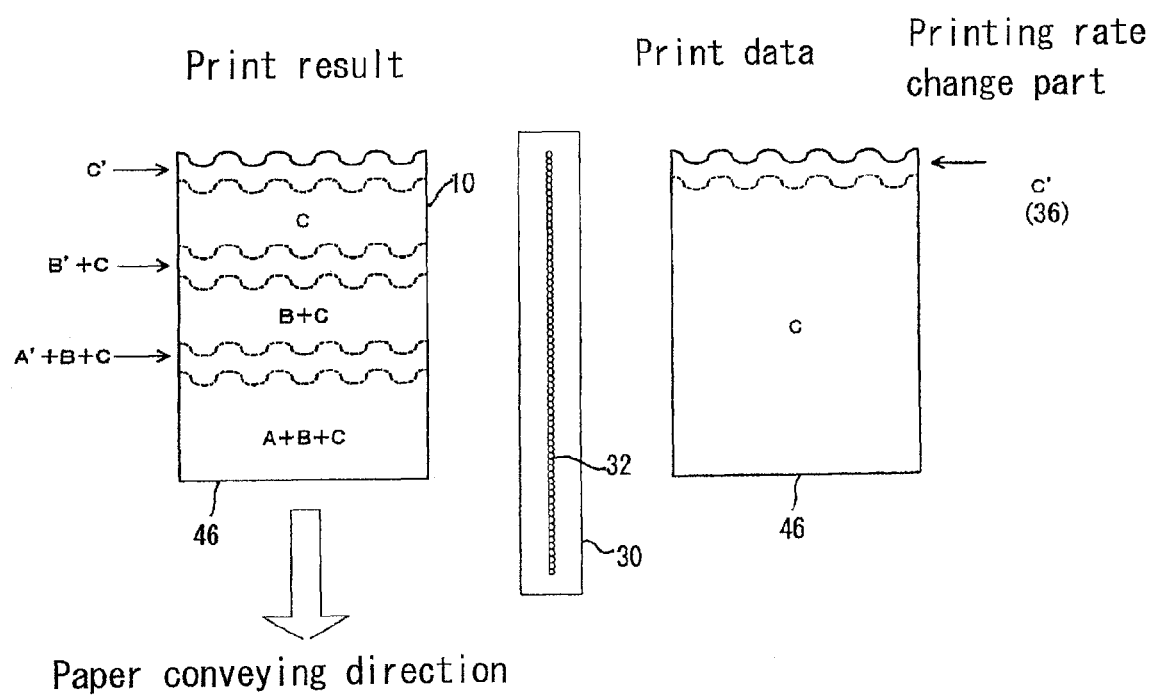
FIG. 18 is an explanatory diagram showing other embodiment of the present invention.
Figure 19:
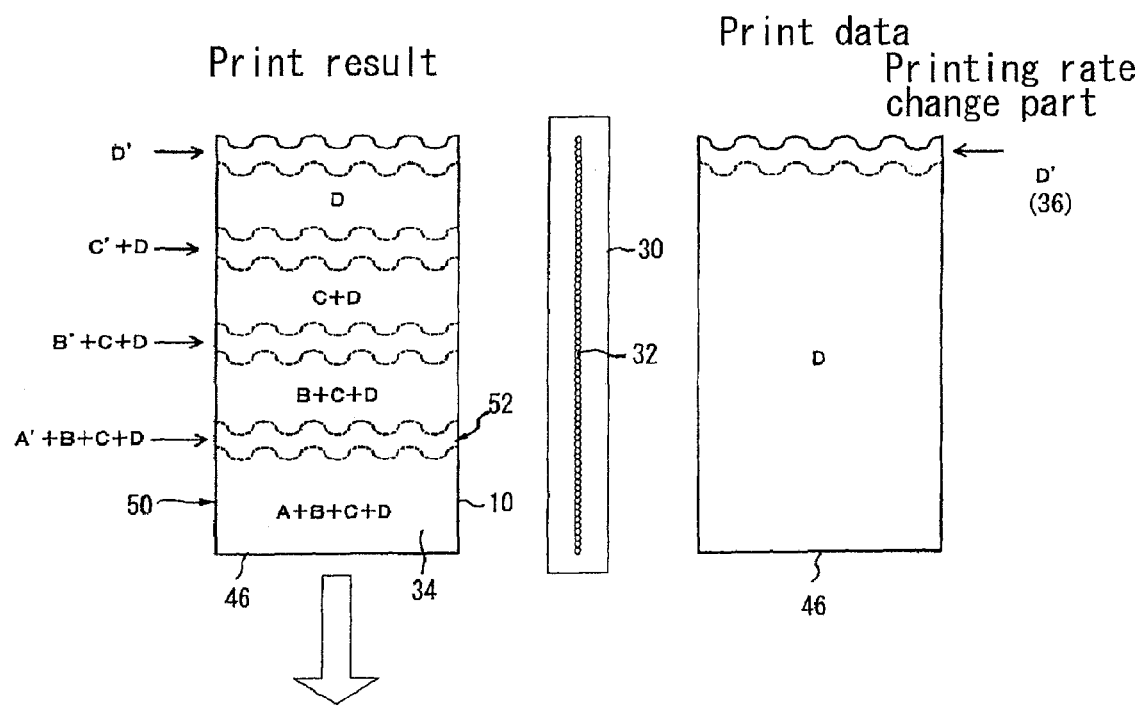
FIG. 19 is an explanatory diagram showing other embodiment of the present invention.

FIG. 16 to FIG. 19 disclose print data A, B, C, D corresponding to initial four times of scanning of the printing head 30. As shown in FIG. 19, by four times of scanning by the printing head 30, printing of the image corresponding to a scanning region 33 of the portion of 50 nozzles is completed.

The print data A corresponds to the portion of 104 nozzles of the printing head in the size in the sub-scanning direction of the data, and on the basis of the conveying direction of the printing medium 10, a deformed data portion 36 of waveform of the portion of 54 nozzles is formed adjacently to a rear end portion 34 of main data portion (e). This deformed data portion 36 is formed at rear end portions 34 of all main data portions of print data A, B, C, D. Herein, the front end portion and the rear end portion are based on the conveying direction of the printing medium, that is, the sub-scanning direction in the printing apparatus.

Figure 15:
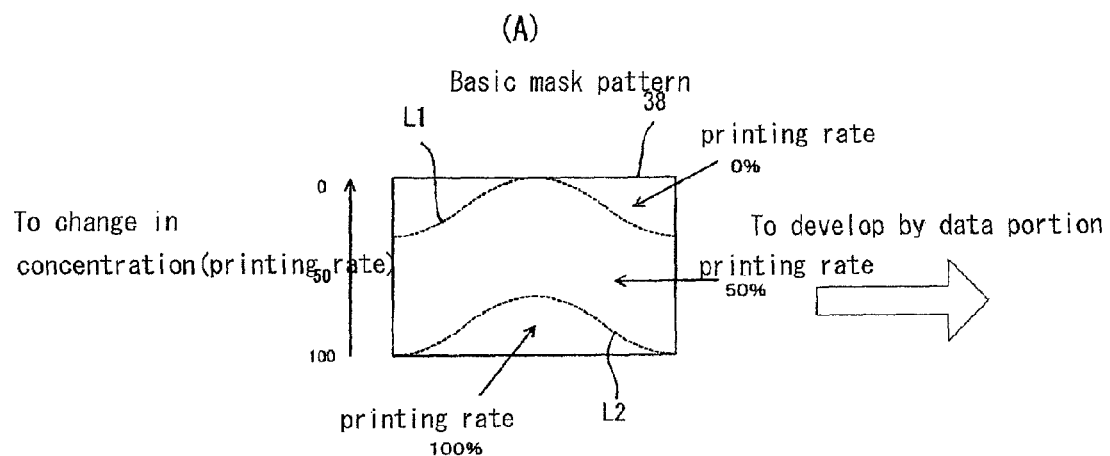
FIG. 15 is an explanatory diagram of the present invention.
Figure 15:
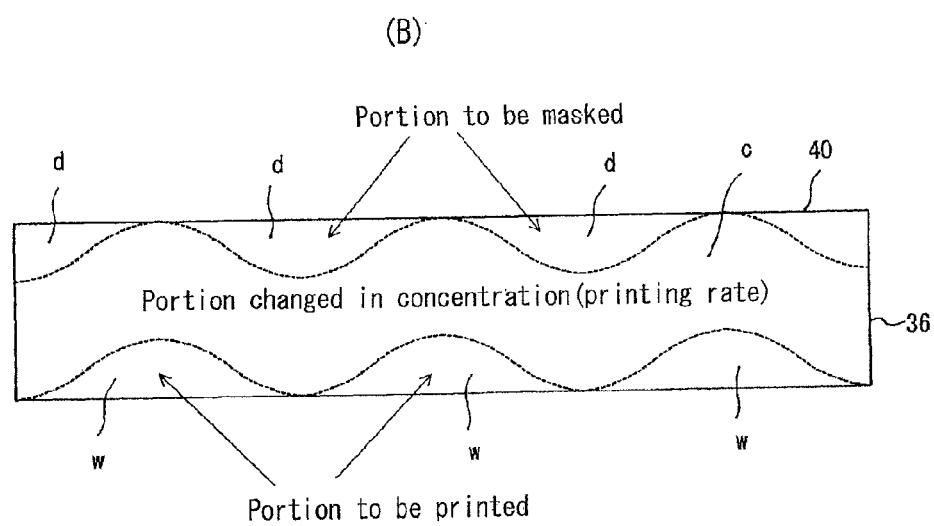

In the preferred embodiment, the deformed data portion 36 is composed of, as shown in FIG. 15 (B), waveform region (w) of 100% printing rate (density), printing rate changed region (c) of 50% printing rate, and waveform region (d) of 0% printing rate. As a result, the deformed data portions 36 formed in each print data are composed as shown in FIG. 1 (B), changing in the printing rate in the sub-scanning direction to 0%, 50% or 0%, 50%, 100% or 50%, 100%. Herein, the printing rate refers to the rate of printing of data required to be printed by one scanning, and the printing rate of 100% means that all data is printed completely (100%). Around the wave-shaped profile 41 of the deformed data portion 36, a profile ambiguous state generating portion for making the profile 41 ambiguous is formed. This profile ambiguous state generating portion is same as the dot state of the peripheral portion of the profile 41 of the deformed data portion 36 shown in FIG. 13 (D).

FIG. 15 shows a method of creating deformed data portion 36. The controller 6 stores a basic mask pattern 38 for creating the deformed data portion preliminarily in its memory. The basic mask pattern 38 is composed of a region of 0% printing rate, a region of 50% printing rate, and a region of 100% printing rate, together with the profile ambiguous state generating region in the peripheral portion of the wave-shaped profile 41. The boundary of 0% printing rate and 50% printing rate, and the boundary of 50% printing rate and 100% printing rate contact with each other in a waveform profile. An upper undulation profile L1 formed in the boundary of 0% printing rate and 50% printing rate and a lower undulation line L2 formed in the boundary of 50% printing rate and 100% printing rate are waveforms in the preferred embodiment, but are not limited, and may include triangular wave pattern, protruding pattern, sawtooth pattern, and any other undulation pattern as far as dots are not arrayed continuously in the main scanning direction. Around the upper undulation profile line L1, the profile ambiguous state generating region is formed.

The height and length of the waveform patterns are not specified, may be set freely as required, and the patterns are not specified particularly. To create a deformed data portion 36 at the end portion of print data A, the data of the width portion of 54 nozzles adjacent to the rear end portion of main data portion (e) of print data A is data 40 of change portion, and by developing as shown in FIG. 15 (B) so that the waveform of basic mask pattern 38 may be connected to this data 40, and in the data 40 of change portion, various portions are generated, specifically, a masked portion or portion (d) almost free from dots positioned in the outside region of the wave-shaped profile 41, a printing rate change portion (c) changed in the density to 50% positioned in the inside region of the wave-shaped profile 41, and a portion (w) of 100% printing rate. Around the profile 41, the profile ambiguous state generating region is formed.

Figure 25:
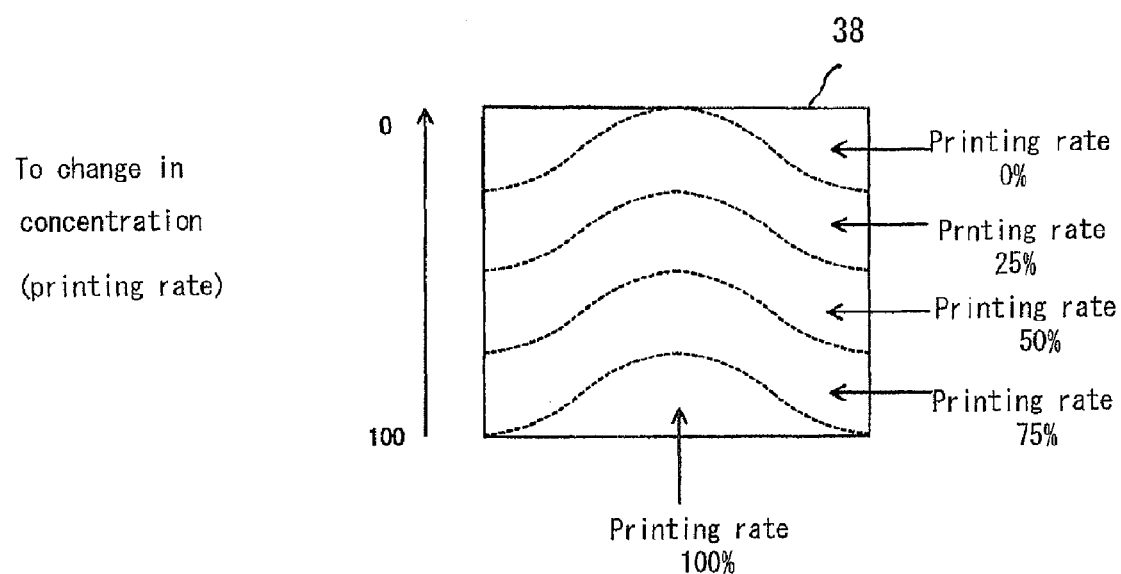
FIG. 25 is an explanatory diagram showing other embodiment of the present invention.

The printing rate change region (c) of 50% printing rate of the basic mask pattern is not particularly limited to a region of 50% printing rate alone, and is not limited to a single printing rate. As shown in FIG. 25, in the basic mask pattern 38, regions of plural printing rates may be provided, such as 0%, 25%, 50%, 75%, and 100%, and the data 40 may be formed in plural regions differing in the printing rate such as 0%, 25%, 50%, 75%, and 100%, and thus the regions may be composed to change in the printing rate in the sub-scanning direction. In the basic mask pattern 38 in FIG. 25, too, on the upper profile L1, a profile ambiguous state generating portion is formed in its periphery (not shown). The deformed data portion 36 of each print data is determined by the basic mask pattern, and dot information of region (d) is deleted as shown in FIG. 15, and the dot information in region (c) is decimated according to the printing rate. The deleted and decimated dot information must be complemented when printing is completed in the deformed data portion of each print data.

Accordingly, the controller creates the complementary data and stores in the memory in every deformed data portion as the data for complementing the deleted and decimated dot information of deformed data portion of print data. As described below, in the printing operation after the fifth time, in the deformed data portion 36, the complementary data including the deleted and decimated dot information is overlapped and printed, and the deformed data portion 36 is complemented. For example, the 50% printing rate portion of the deformed data portion is complemented by the 50% printing rate portion of the complementary data. That is, the concentration distribution between deformed data portion 36 and complementary data for complementing the deformed data portion 36 is determined so that the summed total may be 100%. In this case, the complementary data is not limited to the data complemented by one printing operation, and the data may be complemented by plural times of printing. For example, the concentration change portion (c) of deformed data portion 36 printed at 50% printing rate (density) may be complemented by two times of printing by two portions of complementary data of 30% and 20% concentration. Also considering the drying effect of the ink by a heater on the printed surface, the printing rate may be distributed by complementing first by the complementary data of 80% concentration, then by the data of 20%.

By such composition, when drying the ink by a heater, first, if the ink amount is slightly larger, it is dried sufficiently by a longer time, but in a later printing process, since the drying time is shorter, the ink may not be dried sufficiently, and such problem is solved. This is not caused by the time, but the total amount of ink discharged in the place is larger by later printing than by first printing, and drying is easier when the later printing amount is decreased.

The technique of varying the printing rate of deformed data portion and complementary data portion in the sub-scanning direction is not limited to the mask pattern operation, but may be applied to an operation of reproducibility by decimating dot information simply by calculation by using a controller. It may be also applied in an operation of changing the printing rate change portions other than 0% printing rate of deformed data portion 36 or complementary data finely and continuously by gradation technology. Of the print data A shown in FIG. 16, complementary data A" of deformed data portion 36 shown as print change portion A' is created by mask pattern (not shown) inverting the on (print) or off (delete) dot information of basic mask pattern 38 shown in FIG. 15 (A). This is the same in the other complementary data B", C", D", and E" described later.

Figure 20:
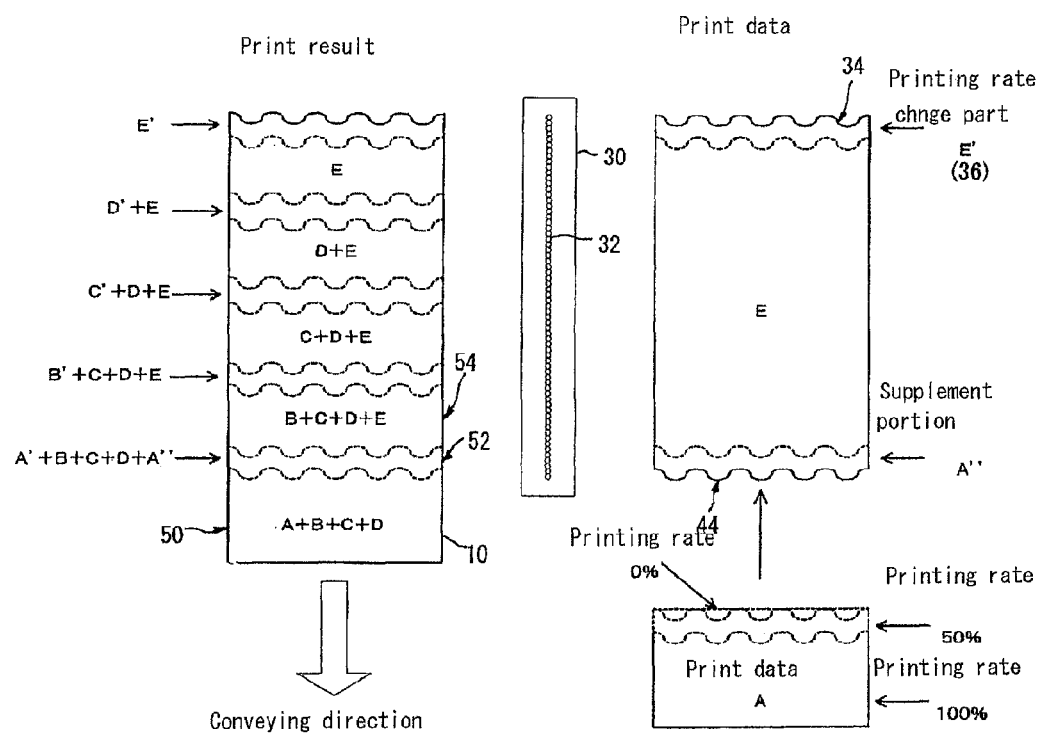
FIG. 20 is an explanatory diagram showing other embodiment of the present invention.

As shown in FIG. 16 to FIG. 19, out of the print data, in print data A, B, C, and D including the front end portion 46 or the printing start end of the original image, deformed data portions 36, that is, A', B', C', and D' are formed in the rear end portion 34 in the conveying direction, and as shown in FIG. 21 to FIG. 24, in print data F, G, H, and I including the rear end portion 48 or the printing terminal end of the original image, complementary data B", C", D", and E" are formed in the front end portion 44 in the conveying direction, and as shown in FIG. 20, in print data E of intermediate portion not including front and rear end portions of the original image, complementary data A" is formed in the front end portion in the conveying direction, and deformed data portion E' is formed in the rear end portion. The joint sides of print data A, B, C, D, E, F, G, H, and I forming deformed data portion and complementary data are shaped like waveforms generated in an ambiguous profile state.

In this manner, when the front and rear end portions of the print data in the conveying direction are changed (step 5), the controller 4 transfers the print data to the printing head 30 (step 6), and executes printing by the head unit 16 (step 7), and conveying of the printing medium 10 (step 8), and the original image is printed on the printing medium 10. The operation at steps 7 and 8 is explained below while referring to FIG. 16 to FIG. 24.

FIG. 16 shows a first scanning by the printing head 30. When the printing head 30 completes a first scanning operation by its group of 104 nozzles, print data A of waveform shape at joint side is printed in the printing medium 10. The printing medium 10 is conveyed in the conveying direction by the portion of 50 nozzles. Next, as shown in FIG. 17, the printing head 30 moves in the main scanning direction, and executes a second printing, and print data B of waveform shape at joint side having a length corresponding to 154 nozzles is printed. When the second printing by the printing head 30 is completed, the printing medium 10 is conveyed in the conveying direction by the portion of 50 nozzles. Thus, third and fourth printing are operated as shown in FIGS. 18 and 19.

When the fourth printing is completed, printing of a first region 50 corresponding to the length of 50 nozzles of the printing medium 10 is completed. This region 50 corresponds to A+B+C+D shown in FIG. 8, in which scanning is done four times by print data A, B, C, D. But in a region 52 of 54 nozzles adjacent to the first region 50 of the printing medium 10, as indicated by A'+B+C+D, deformed data portion A' of print data A, and print data B, C, D are printed, and this region is not complemented yet by printing of dot information deleted and decimated from deformed data portion A'. Therefore, the deformed data portion A' must be complemented with complementary data A" including the complementary data of 50% concentration.

Next, as shown in FIG. 20, the printing medium 10 is conveyed in the conveying direction by the portion of 50 nozzles, and the printing head 30 is moved in the main scanning direction to execute fifth printing, and print data E having a length of 254 nozzles in the intermediate portion of the original image is printed. At this time, the data deleted and decimated portion of change data portion in region 52 is complemented by complementary data A" of the print data A. That is, at the front end portion 44 (joint side) of print data E, the complementary data A" composed of complementary data A" of the print data A is created.

Figure 21:
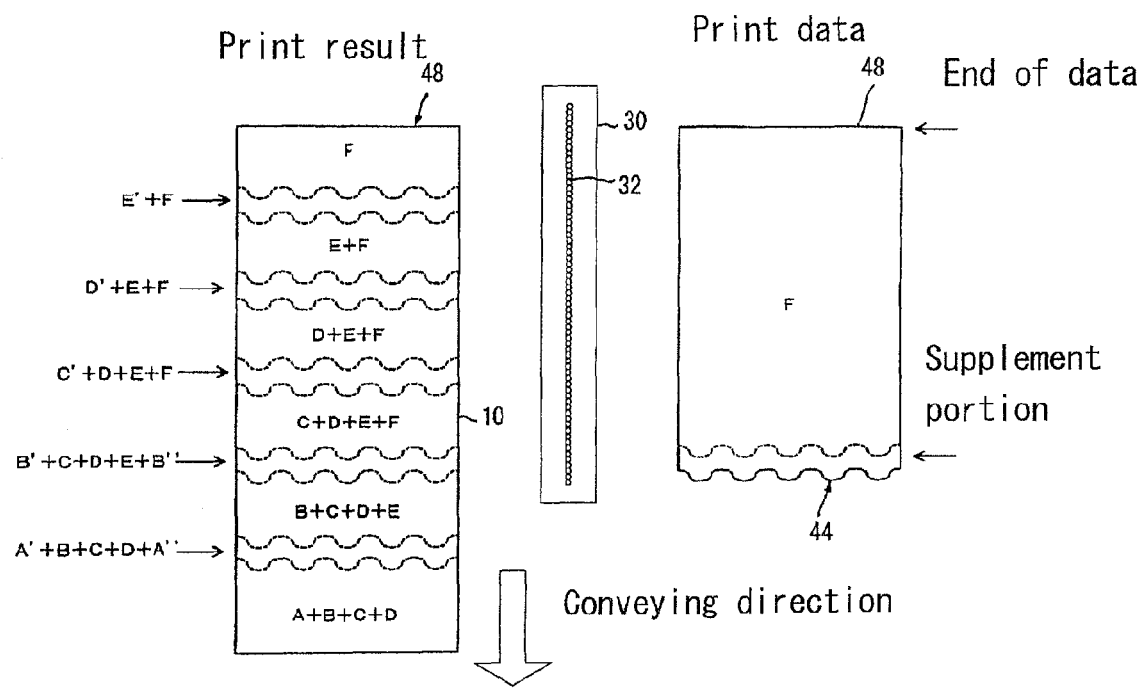
FIG. 21 is an explanatory diagram showing other embodiment of the present invention.

The print data E having a length of 254 nozzles in the intermediate portion of one original image is created as complementary data A" for complementing the deformed data portion A' of the adjacent region 50, at its front end portion 44. The waveform concave and convex shapes of the complementary data A" of the print data E, that is, at the joint side coincide precisely with the waveform concave and convex shapes at the joint side of the print data A. As a result, at the joint (boundary) of the first region 50 and second region 54 of the printing medium 10, lines continuously extending in the main scanning direction are not formed, and streak-like phenomenon does not appear in the scanning direction of the head. This is the same at the joints with other regions of the printing medium 10. A sixth printing is executed by print data F in the length of 254 nozzles including the rear end portion 48 of the original image as shown in FIG. 21. In the print data F, at its front end, complementary data B" for complementing deformed data portion 36 (B') of the print data B is formed.

Figure 22:
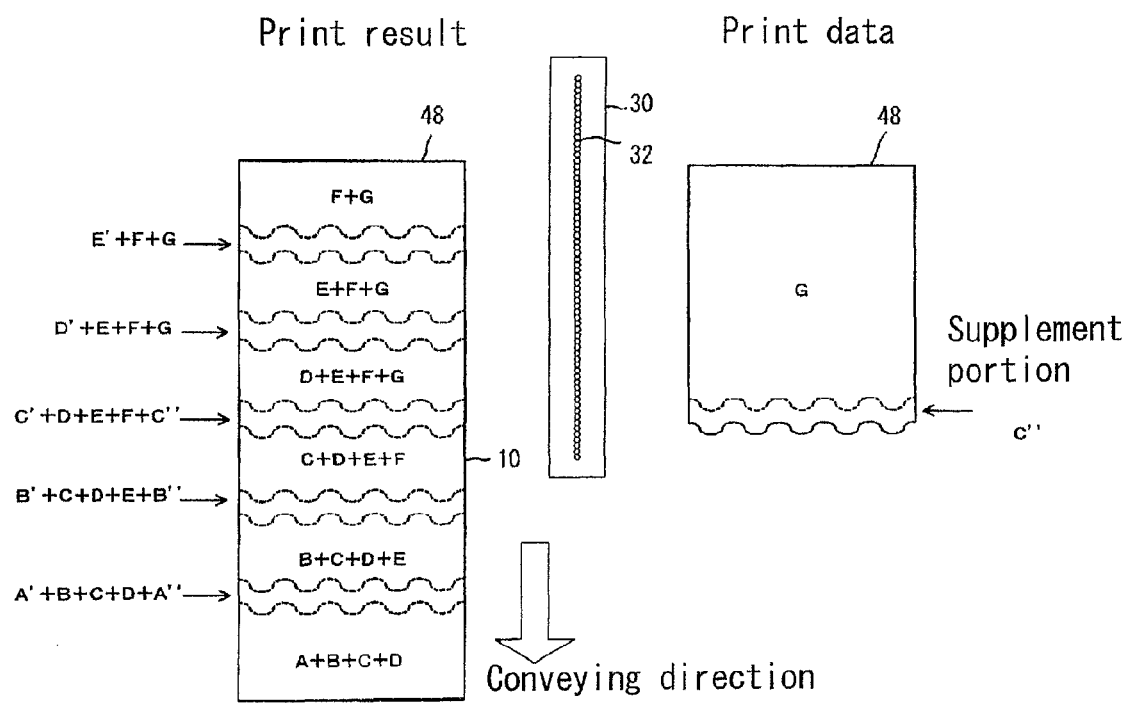
FIG. 22 is an explanatory diagram showing other embodiment of the present invention.

The waveform concave and convex shapes of the print data F at the joint side coincide precisely with the waveform concave and convex shapes of the print data B at the joint side. A seventh printing is executed by print data G in the length of 204 nozzles including the rear end portion 48 of the original image as shown in FIG. 22. In the print data G, at its front end, complementary data C" for complementing deformed data portion 36 (C') of the print data C is formed. The waveform concave and convex shapes of the print data G at the joint side coincide precisely with the waveform concave and convex shapes of the print data C at the joint side, and the complementary data C" is overlapped and printed on the deformed data portion C', and the deformed data portion C' of the print data C is complemented by the complementary data C".

Figure 23:
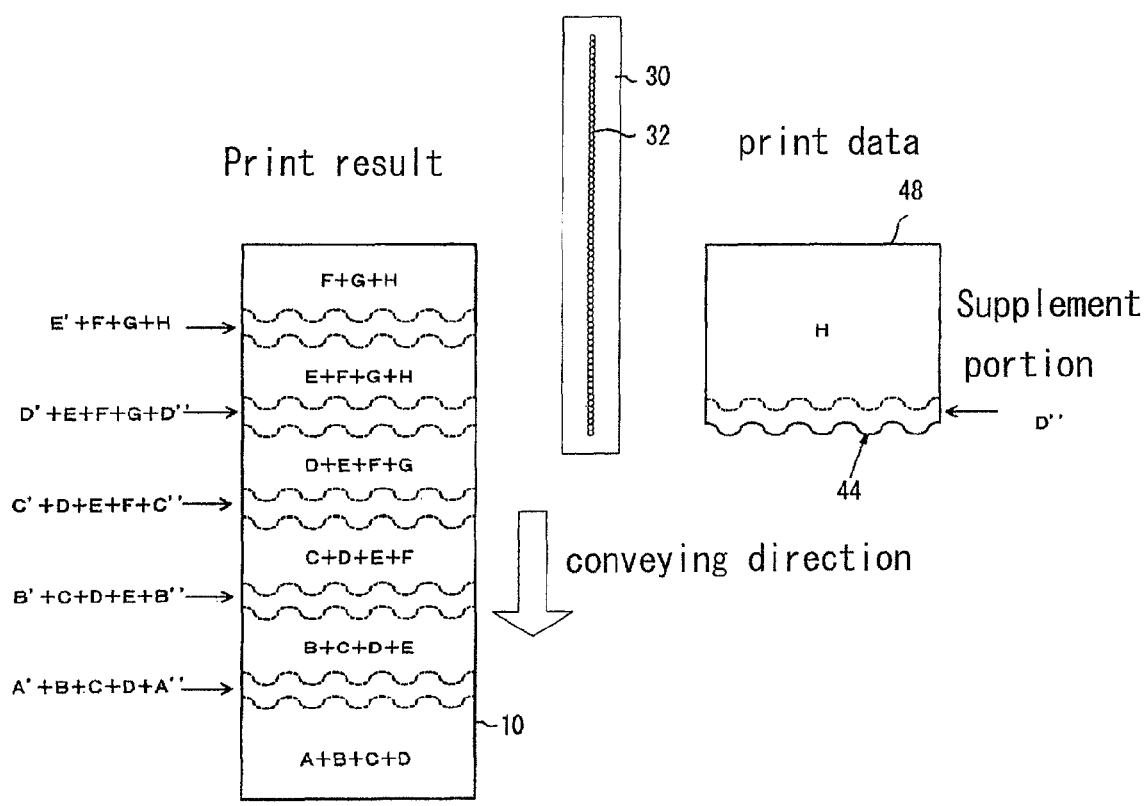
FIG. 23 is an explanatory diagram showing other embodiment of the present invention.
Figure 24:
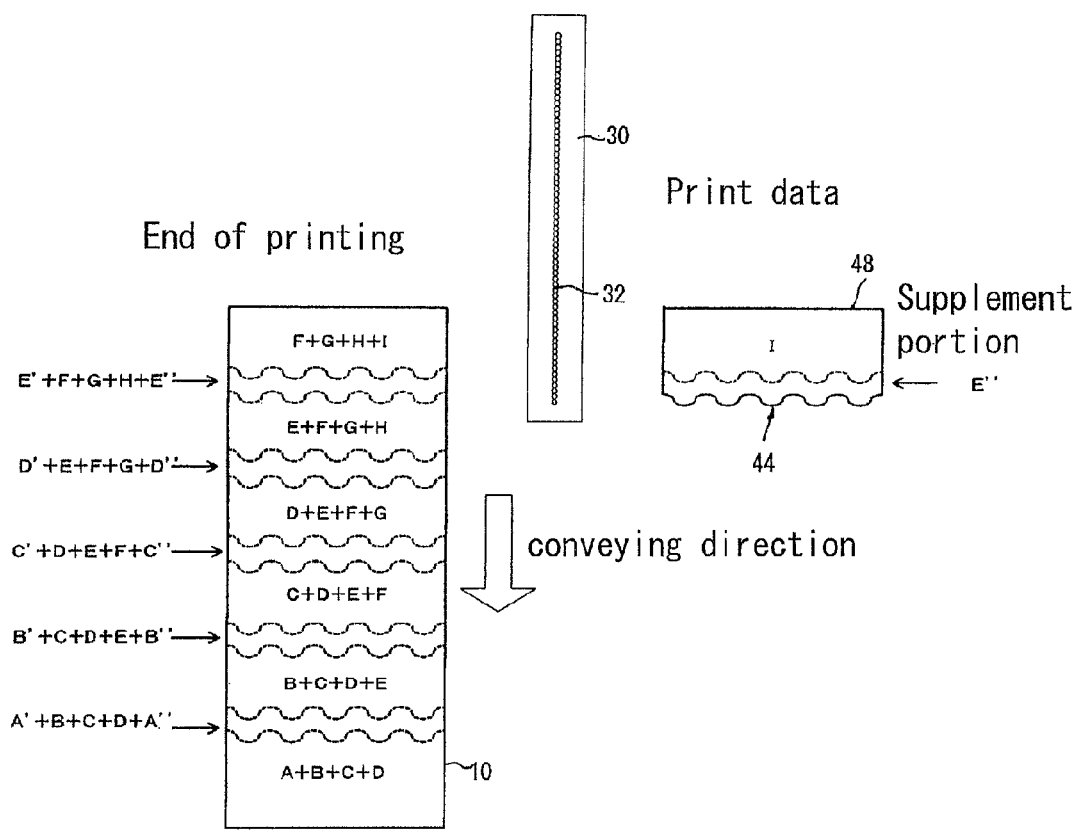
FIG. 24 is an explanatory diagram showing other embodiment of the present invention.

An eighth printing is executed by print data H in the length of 154 nozzles including the rear end portion 48 of the original image as shown in FIG. 23. In the print data H, at its front end, complementary data D" for complementing deformed data portion 36 (D') of the print data D is formed. The waveform concave and convex shapes of the print data H at the joint side coincide precisely with the waveform concave and convex shapes of the print data D at the joint side.

A ninth printing is executed by print data I in the length of 104 nozzles including the rear end portion 48 (printing terminal end) of the original image. In the print data I, at its front end portion 44, complementary data portion E" for complementing the deformed data portion 36 (E') of the print data E is formed.

The waveform concave and convex shapes of the deformed data portion 36 of the print data I at the joint side coincide precisely with the waveform concave and convex shapes of the print data E at the joint side, and thereby the deformed data portion 36 (E') of the print data E is complemented by the complementary data E", and printing of the original image is completed. In the preferred embodiment, only the concept is explained, and where the data is continuous, a portion corresponding to data E is created sequentially (refer to step 9 in FIG. 2), and, needless to say, data after F is created finally.

In the preferred embodiment, by forming the deformed data portion changed in printing rate and the profile ambiguous state generating portion at the joint of the print data, the printing regularity at the joint of print data is eliminated, and randomness is generated, and by the synergistic effect with the streak generation preventive effect of the concave and convex shapes of the deformed data portion, generation of streaks at the joint is prevented. Another effect is suppression of continuation of printing in lateral direction from a nozzle of poor printing precision positioned at the end when nozzles for discharging the ink are arrayed in parallel.

In the preferred embodiment, the printing medium is conveyed at equal pitches of 50 nozzles each as mentioned above, but the pitches may be changed in every conveying operation. It is intended to print dots between nozzle pitches when printing at small nozzle pitches, and equal pitches are 50 nozzles, but the pitches may be changed in every conveying operation by feeding 49 nozzles or by feeding 51 nozzles. In the relation between the conveying of printing medium (paper) and scanning of printing head, printing and paper feed may be done by a going stroke of the printing head, and printing and paper feed may be done by a returning stroke of the printing head, but a same line may be printed by going stroke and returning stroke of the head, and hence the head scanning and paper feed are not limited to the illustrated methods in the preferred embodiment.

The controller 4 judges whether printing of data is complete at step 9 in FIG. 2 or not, and stops the printing if judged affirmatively.

Figure 26:
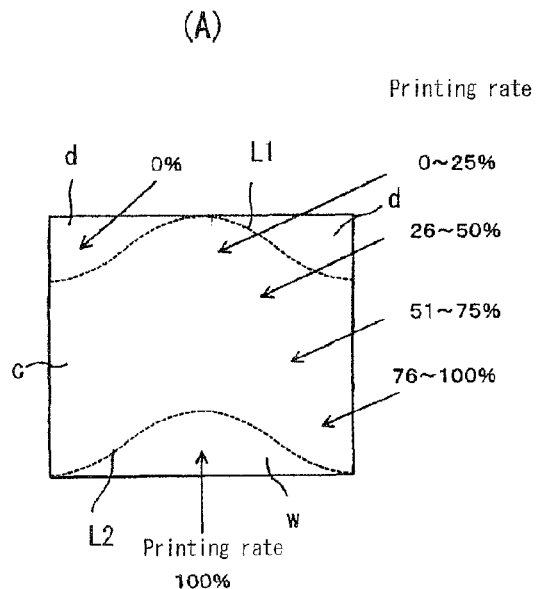
FIG. 26 is an explanatory diagram showing other embodiment of the present invention.
Figure 27:
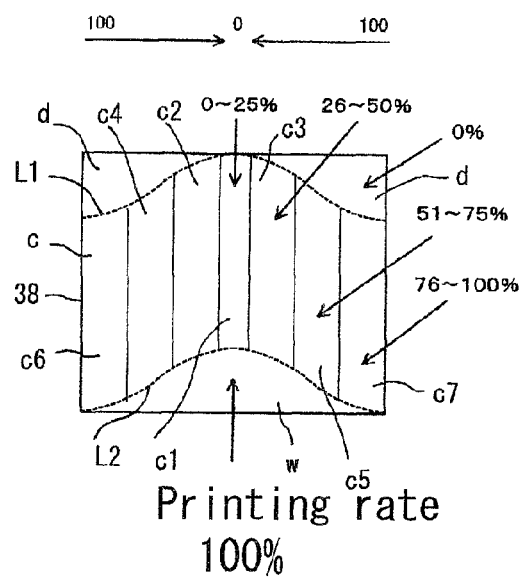
FIG. 27 is an explanatory diagram showing other embodiment of the present invention.

In the preferred embodiment, the printing rate of the deformed data portion is changed in the sub-scanning direction, but by using a mask pattern changing in the printing rate in the main scanning direction, the printing rate of the deformed data portion may be changed in the main scanning direction. In this case, as shown in FIG. 26, the basic mask pattern 38 is composed of a region (d) of 100% printing rate, a region (c) changing in the printing rate in the main scanning direction, a region (w) of 100% printing rate, and a profile ambiguous state generating region (not shown). Further as shown in FIG. 27, the region (c) is segmented into a region c1 of 0 to 25% printing rate, regions c2, c3 of 26 to 50% printing rate, regions c4, c5 of 51 to 75% printing rate, and regions c6, c7 of 76 to 100% printing rate. The regions c1 to c7 are composed so as to be highest in the printing rate at the right and left end side, and gradually lower in the printing rate as going toward the center as shown in FIG. 27. A profile ambiguous state generating region (not shown) is formed on the wave-shaped profile L1 and its periphery.

Figure 28:
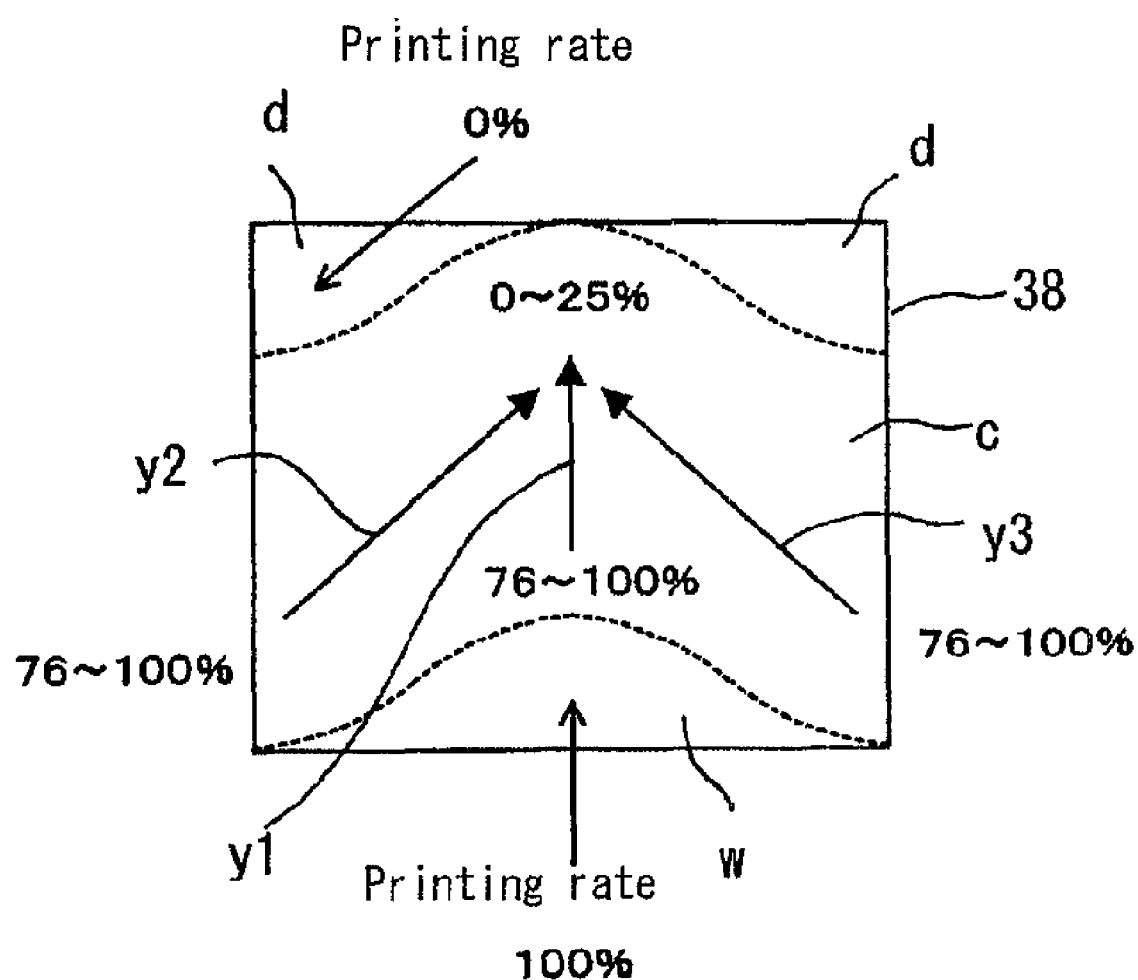
FIG. 28 is an explanatory diagram showing other embodiment of the present invention.

The basic mask pattern 38 changing in the printing rate in the main scanning direction is not limited to the profile shown in FIG. 27 in which the printing rate is changed only in the lateral direction (main scanning direction), but may be formed in a profile as shown in FIG. 28 in which the printing rate is changed in both longitudinal direction (sub-scanning direction) and lateral direction (main scanning direction). In FIG. 28, in the region (c) of basic mask pattern 38, the printing rate is changed from 76 to 100% to 0 to 25%, from lower part to upper part in the central region. The right and left regions of the region (c) are changed in the printing rate from 76 to 100% to 0 to 25% from lower part obliquely to central upper part.

In FIG. 28, arrow y1 indicates a state of printing rate of central part of region (c) becoming lower along the longitudinal direction (sub-scanning direction) in the direction of arrow, and arrows y2 and y3 indicate a state of printing rate in right and left regions of region (c) becoming lower along the longitudinal direction (sub-scanning direction) and lateral direction (main scanning direction) in the direction of arrow. The boundary of region (d) and region (c) of 0% printing rate, and region (c) and region (w) of 100% printing rate contact with each other in a wave profile. An undulation profile L1 formed in the boundary of region (d) of 0% printing rate and region (c), and an undulation line L2 formed in the boundary of region (w) of 100% printing rate and region (c) are waveforms in the preferred embodiment, but are not limited, and may include triangular wave pattern, protruding pattern, sawtooth pattern, and any other undulation pattern as far as dots are not arrayed continuously in the main scanning direction.

Another preferred embodiment of the present invention is described while referring to FIG. 2 and FIGS. 16 to 24, and FIGS. 29 to 31.

The configuration of the printing apparatus used in the preferred embodiment is same as the configuration of the first preferred embodiment shown in FIG. 1 and FIG. 2. The principle of the printing operation of the printing apparatus used in the preferred embodiment is same as in the printing operation in the second preferred embodiment, and the printing operation of the preferred embodiment is explained by referring to FIGS. 16 to 24 used in the explanation of the second preferred embodiment.

Figure 31:
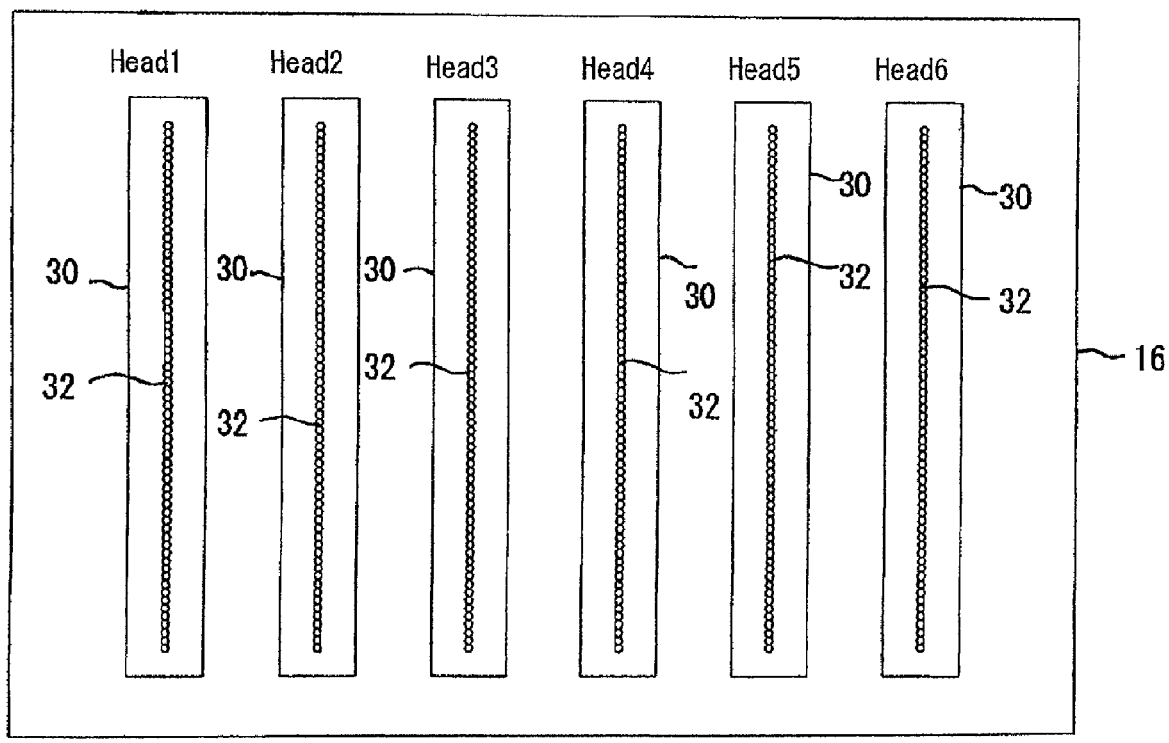
FIG. 31 is an explanatory diagram of a printing head.

The computer 8 creates the print data to be printed out, such as sign characters, and patterns, graphics. The print data created by the computer 8 is transferred to the controller 4 by way of the connector 6 (steps 1, 2). The controller 4 receives the print data from the computer 8 according to the program stored in the memory, and analyzes the print data (step 3). A CMYK conversion unit of the controller 4 converts the colors of pixels into ink colors that can be printed by the printer 2. Consequently, the print data is converted into data for printing corresponding to the ink jet printing head (step 4). FIG. 31 shows a printing head 30 used in this preferred embodiment.

The printing unit 16 includes six printing heads 30 for discharging inks of corresponding colors, black (B), cyan (C), magenta (M), and yellow (Y). For the ease of explanation, herein, only one printing head 30 of the plurality of printing heads is explained. The configuration and operation of the other printing heads are same as in the printing head 30 described below. In the preferred embodiment, the printing head 30 has a total of 256 nozzles 32 arrayed in the sub-scanning direction. In the drawing, all nozzles are not shown because the space is limited. Of course, the resolution of the printing head 30 is not particularly specified, and the number of nozzles is not limited to 256.

The nozzle sequence of the printing head 30 may be formed either in a single row or in a plurality of rows. Among 256 nozzles, for example, when desired to complete printing in four times of scanning, if one paper transfer distance is the portion of 50 nozzles, 200 nozzles, that is, 50 nozzles times 4, and 54 nozzles for printing end portion data are assigned as nozzles for printing, and the data is printed by using a total of 254 nozzles, and two other nozzles are not used. Of the 54 nozzles for printing the end portion data, as shown in FIG. 16, 18 nozzles are used for printing a region (a) including waveform portion (w) of 100% printing rate of deformed data portion 36 as mentioned below, and the remaining 36 nozzles are used for printing of printing rate change region (b) changed in the printing rate having concave and convex parts. The number of nozzles to be used, the conveying distance, and the number of times of scanning may be changed as desired.

FIG. 16 to FIG. 19 disclose print data A, B, C, D corresponding to initial four times of scanning of the printing head 30. As shown in FIG. 19, by four times of scanning by the printing head 30, printing of the image corresponding to a scanning region 33 of the portion of 50 nozzles is completed. As shown in FIG. 6, print data A corresponds to the portion of 104 nozzles of the printing head in the size in the sub-scanning direction of the data, and on the basis of the conveying direction of the printing medium 10, a deformed data portion 36 of waveform of the portion of 54 nozzles is formed adjacently to a rear end portion 34 of main data portion (e). This deformed data portion 36 is formed at rear end portions 34 of all main data portions of print data A, B, C, D. Herein, the front end portion and the rear end portion are based on the conveying direction of the printing medium, that is, the sub-scanning direction in the printing apparatus.

In the preferred embodiment, the deformed data portion 36 is composed of, as shown in FIG. 16, waveform region (w) of 100% printing rate (density), printing rate change region (c) of 50% printing rate, waveform region (d) of 0% printing rate, and a profile ambiguous state generating region (not shown). The printing rate of the printing rate change region (c) is not limited to 50% printing rate alone, but may be various printing rates. The printing rate may be changed from 0% to 100% in gradual steps or continuously in the sub-scanning direction or main scanning direction. Herein, the printing rate refers to the rate of printing of data required to be printed by one scanning, and the printing rate of 100% means that all data is printed completely (100%).

Figure 29:
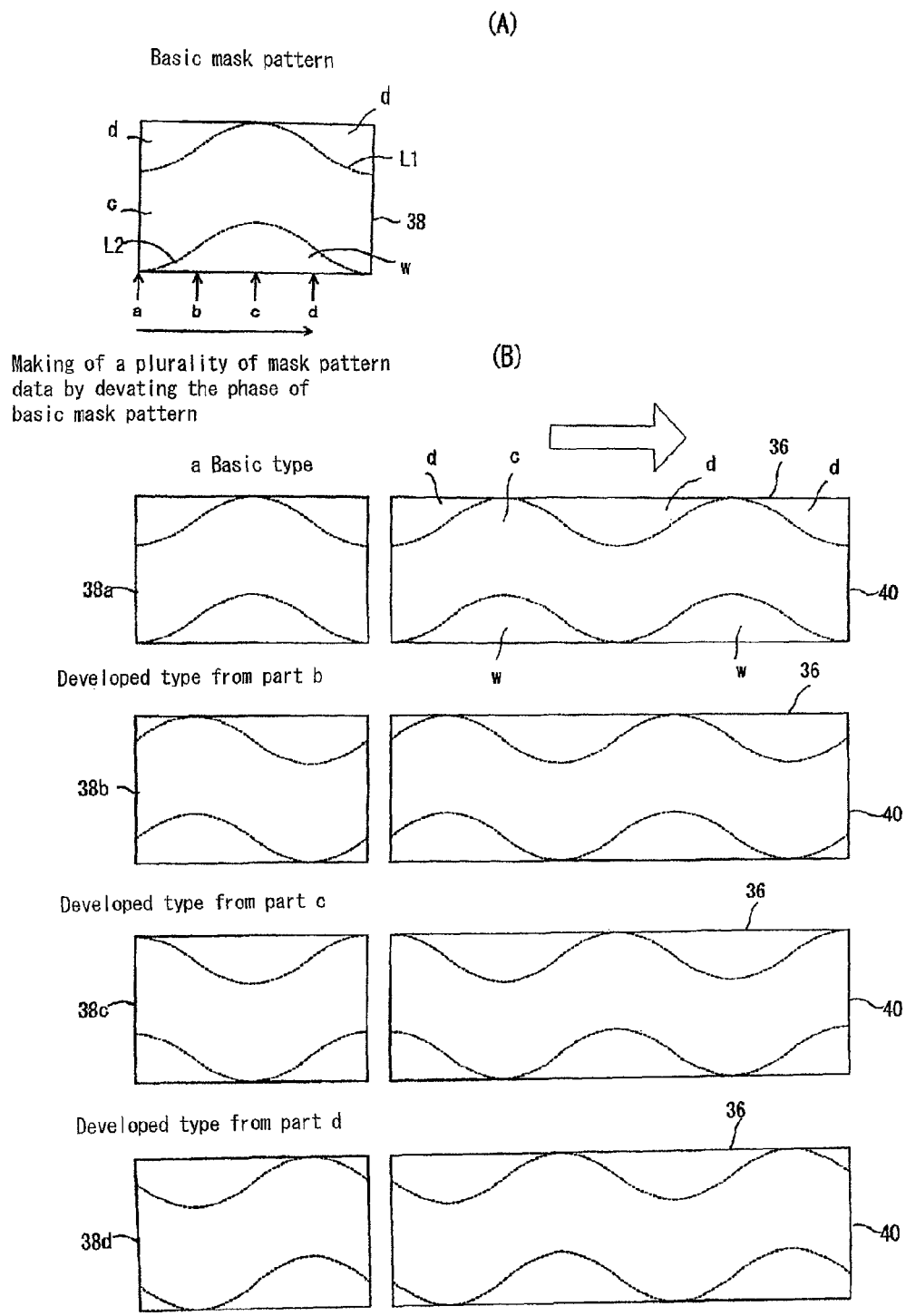
FIG. 29 is an explanatory diagram showing other embodiment of the present invention.

FIG. 29 shows a method of creating deformed data portion 36. The controller 6 stores a basic mask pattern 38 for creating the deformed data portion preliminarily in its memory. The basic mask pattern 38 is composed of a region (d) of 0% printing rate, a region (c) changed in the printing rate in the main scanning direction, and a region (w) of 100% printing rate. The boundary of region (d) and region (c) of 0% printing rate and region (c) and region (w) of 100% printing rate contact with each other in a wave profile. An undulation line L1 formed in the boundary of region (d) and region (c) of 0% printing rate, and an undulation line L2 formed in the boundary of region (c) and region (w) of 100% printing rate are waveforms in the preferred embodiment, but are not limited, and may include triangular wave pattern, protruding pattern, sawtooth pattern, and any other pattern as far as dots are not arrayed continuously in the main scanning direction. The height and length of the waveform patterns are not specified, may be set freely as required, and the patterns are not specified particularly. The profile ambiguous state generating region is formed in the periphery of the undulation profile L1.

To create a deformed data portion 36 at the end portion of print data A, the data of the width portion of 54 nozzles adjacent to the rear end portion of main data portion (e) of print data A is data 40 of change portion, and by developing so that the waveform of basic mask pattern 38 may be connected to this data 40, and in the data 40 of change portion, a masked portion, that is, portion (d) free from dots, printing rate change portion (c) changed in the density, portion (w) of 100% printing rate, and a profile ambiguous state generating portion are formed. The printing range change region (c) of the basic mask pattern 38 is not limited to a specific printing rate. The deformed data portion 36 of each print data is determined by the basic mask pattern 38, and the dot information in region (d) is deleted as shown in FIG. 16, and the dot information in the region (c) is decimated according to the printing rate. In the preferred embodiment, aside from the generation of deformed data portion by the basic mask pattern data 38a of the basic mask pattern 38, the phase of the basic mask pattern 38 shown in FIG. 29 is deviated, and a plurality of mask pattern data 38b, 38c, 38d are created, and a deformed data portion 36 is created in the print data on the basis thereof. On the wave-shaped upper profile 41 of the deformed data portion 36 and in its periphery, a profile ambiguous state generating portion for making the profile 41 ambiguous is formed. This profile ambiguous state generating portion is same as the dot state of the peripheral portion of the profile 41 of the deformed data portion 36 shown in FIG. 13 (D).

Mask pattern data 38a starting from point (a) on the axis of abscissas (position) of basic mask pattern 38 as start point of the period of dot deletion and decimation pattern is shown as a basic form in FIG. 29 (B). Mask pattern data 38b starting from point (b) deviated in phase from point (a) of basic mask pattern 38 as start point of pattern period is shown as a developed form from the portion (b). Mask pattern data 38c starting from point (c) of basic mask pattern 38 as start point of pattern period is shown as a developed form from the portion (c). Mask pattern data 38d starting from point (d) of basic mask pattern 38 as start point of pattern period is shown as a developed form from the portion (d). In the preferred embodiment, the print data having deformed data portion 36 deformed by the mask pattern data 38a is supplied to Nos. 1, 3, and 5 printing heads 30, and the print data having deformed data portion 36 deformed by the mask pattern data 38c is supplied to Nos. 2, 4, and 6. Of course, the combination of the mask pattern data and the printing heads are not limited to these examples alone. The dot information deleted and decimated from the data 40 of each print data must be complemented when printing of the deformed data portion of each print data is complemented.

Accordingly, the controller creates the complementary data and stores in the memory in every deformed data portion as the data for complementing the deleted and decimated dot information of deformed data portion of print data. As described below, in the printing operation after the fifth time, in the deformed data portion 36, the complementary data including the deleted and decimated dot information is overlapped and printed, and the deformed data portion 36 is complemented. The concentration distribution between deformed data portion 36 and complementary data for complementing the deformed data portion 36 is determined so that the summed total may be 100%. In this case, the complementary data is not limited to the data complemented by one printing operation, and the data may be complemented by plural times of printing. For example, the concentration change portion (c) of deformed data portion 36 printed at 50% printing rate (density) may be complemented by two times of printing by two portions of complementary data of 30% and 20% concentration. Moreover, by grouping the printing heads into Nos. 1, 2, Nos. 3, 4, No. 5 and No. 6, the same effects are obtained by using four mask patterns, smaller than the number of printing heads.

Also considering the drying effect of the ink by a heater on the printed surface, the printing rate may be distributed by complementing first by the complementary data of 80% or 90% concentration, then by the data of 20% or 10%. By such consideration, when drying the ink by a heater, first, if the ink amount is slightly larger, it is dried sufficiently by a longer time, but in a later printing process, since the drying time is shorter, the ink may not be dried sufficiently, and such problem is solved. This is not caused by the time, but the total amount of ink discharged in the place is larger by later printing than by first printing, and drying is easier when the later printing amount is decreased. The deformed data generating means for changing the printing rate of the deformed data portion or complementary data is not particularly limited to a configuration using the mask pattern, but by using a controller, for example, it is also allowed to employ a reproducible technology for decimating the dot information by a simple calculation.

It may be also applied in an operation of changing the printing rate change portions of deformed data portion 36 or complementary data finely and continuously by gradation technology. In the preferred embodiment, as shown in FIG. 31, the printing unit 16 uses six printing heads 30 No. 1 to No. 6, and prints in six colors. FIGS. 16 to 24 show the printing operation of the No. 1 printing head 30 out of six printing heads 30. In the preferred embodiment, in the No. 1 printing head 30, print data creating a deformed data portion 36 by the mask pattern data 38a shown in FIG. 29 (B) is entered. The printing operation of other No. 2 to No. 6 printing heads 30 is same as the printing operation of No. 1 printing head 30, and the explanation is omitted.

Of the print data A shown in FIG. 16, complementary data A" of deformed data portion 36 shown as print change portion A' is created by mask pattern (not shown) inverting the on (print) or off (delete) dot information of mask pattern 38 shown in FIG. 29 (A). This is the same in the other complementary data B", C", D", and E" described later.

As shown in FIG. 16 to FIG. 19, out of the print data, in print data A, B, C, and D including the front end portion 46 or the printing start end of the original image, deformed data portions 36, that is, A', B', C', and D' are formed in the rear end portion 34 in the conveying direction, and as shown in FIG. 21 to FIG. 24, in print data F, G, H, and I including the rear end portion 48 or the printing terminal end of the original image, complementary data B", C", D", and E" are formed in the front end portion 44 in the conveying direction, and as shown in FIG. 20, in print data E of intermediate portion not including front and rear end portions of the original image, complementary data A" is formed in the front end portion in the conveying direction, and deformed data portion E' is formed in the rear end portion.

The joint sides of print data A, B, C, D, E, F, G, H, and I forming deformed data portions and complementary data are shaped like waveforms.

In this manner, when the front and rear end portions of the print data in the conveying direction are changed (step 5), the controller 4 transfers the print data to the printing head 30 (step 6), and executes printing by the head unit 16 (step 7), and conveying of the printing medium 10 (step 8), and the original image is printed on the printing medium 10. The operation at steps 7 and 8 is explained below while referring to FIG. 16 to FIG. 24. FIG. 16 to FIG. 24 show, for the ease of understanding, the print data forming the deformed data portion and complementary data created by the mask pattern data not deviated in phase, by referring only to the printing operation by the No. 1 printing head 30, and the printing operation by the other printing heads is omitted.

FIG. 16 shows a first scanning by the printing head 30. When the printing head 30 completes a first scanning operation by its group of 104 nozzles, print data A of waveform shape at joint side is printed in the printing medium 10. The printing medium 10 is conveyed in the conveying direction by the portion of 50 nozzles. Next, as shown in FIG. 17, the printing head 30 moves in the main scanning direction, and executes a second printing, and print data B of waveform shape at joint side having a length corresponding to 154 nozzles is printed. When the second printing by the printing head 30 is completed, the printing medium 10 is conveyed in the conveying direction by the portion of 50 nozzles. Thus, third and fourth printing are operated as shown in FIGS. 18 and 19.

When the fourth printing is completed, printing of a first region 50 corresponding to the length of 50 nozzles of the printing medium 10 is completed. This region 50 corresponds to A+B+C+D shown in FIG. 18, in which scanning is done four times by print data A, B, C, D. But in a region 52 of 54 nozzles adjacent to the first region 50 of the printing medium 10, as indicated by A'+B+C+D, deformed data portion A' of print data A, and print data B, C, D are printed, and this region is not complemented yet by printing of dot information deleted and decimated from deformed data portion A'. Therefore, the deformed data portion A' must be complemented with complementary data A" including the complementary data of 50% concentration.

Next, as shown in FIG. 20, the printing medium 10 is conveyed in the conveying direction by the portion of 50 nozzles, and the printing head 30 is moved in the main scanning direction to execute fifth printing, and print data E having a length of 254 nozzles in the intermediate portion of the original image is printed. At this time, the data deleted and decimated portion of change data portion in region 52 is complemented by complementary data A" of the print data A.

That is, at the front end portion 44 (joint side) of print data E, the complementary data A" composed of complementary data A" of the print data A is created.

The print data E having a length of 254 nozzles in the intermediate portion of one original image is created, at its front end portion 44, as complementary data A", or complementary data A" for complementing the deformed data portion A' of the adjacent region 50. The waveform concave and convex shapes of the complementary data A" of the print data E, that is, at the joint side, coincide precisely with the waveform concave and convex shapes of the print data A at the joint side. As a result, at the joint (boundary) of the first region 50 and second region 54 of the printing medium 10, lines continuously extending in the main scanning direction are not formed, and streak-like phenomenon does not appear in the scanning direction of the head. This is the same at the joints with other regions of the printing medium 10. A sixth printing is executed by print data F in the length of 254 nozzles including the rear end portion 48 of the original image as shown in FIG. 22. In the print data F, at its front end, complementary data B" for complementing deformed data portion 36 (B') of the print data B is formed.

The waveform concave and convex shapes of the print data F at the joint side coincide precisely with the waveform concave and convex shapes of the print data B at the joint side, and the complementary data B" is overlapped and printed on the deformed data portion B'. A seventh printing is executed by print data G in the length of 204 nozzles including the rear end portion 48 of the original image as shown in FIG. 21. In the print data G, at its front end, complementary data C" for complementing deformed data portion 36 (C') of the print data C is formed. The waveform concave and convex shapes of the print data G at the joint side coincide precisely with the waveform concave and convex shapes of the print data C at the joint side, and the complementary data C" is overlapped and printed on the deformed data portion C', and the deformed data portion C' of the print data C is complemented by the complementary data C". An eighth printing is executed by print data H in the length of 154 nozzles including the rear end portion 48 of the original image as shown in FIG. 23. In the print data H, at its front end, complementary data D" for complementing deformed data portion 36 (D') of the print data D is formed.

The waveform concave and convex shapes of the print data H at the joint side coincide precisely with the waveform concave and convex shapes of the print data D at the joint side. A ninth printing is executed by print data I in the length of 104 nozzles including the rear end portion 48 (printing terminal end) of the original image. In the print data I, at its front end portion 44, complementary data portion E" for complementing the deformed data portion 36 (E') of the print data E is formed. The waveform concave and convex shapes of the deformed data portion 36 of the print data I at the joint side coincide precisely with the waveform concave and convex shapes of the print data E at the joint side, and thereby the deformed data portion 36 (E') of the print data E is complemented by the complementary data E", and printing of the original image is completed. In the preferred embodiment, only the concept is explained, and where the data is continuous, a portion corresponding to data E is created sequentially (step 9), and, needless to say, data after F is created finally.

Figure 30:
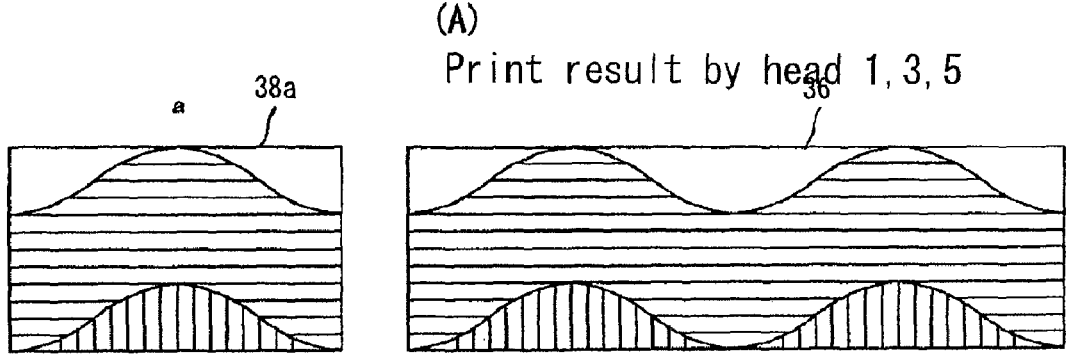
FIG. 30 is an explanatory diagram showing other embodiment of the present invention.
Figure 30:
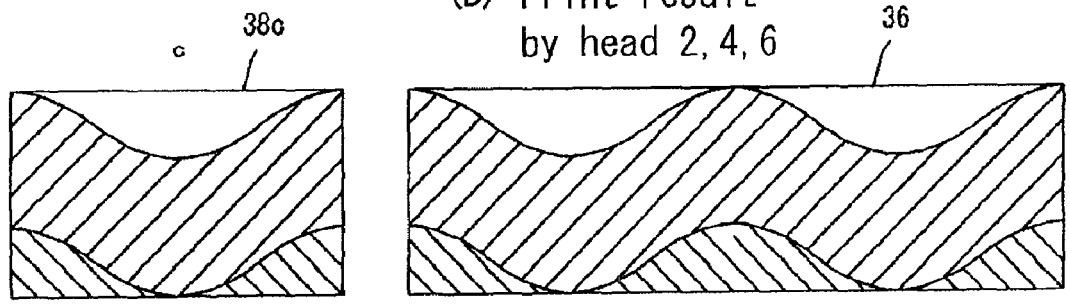
Figure 30:
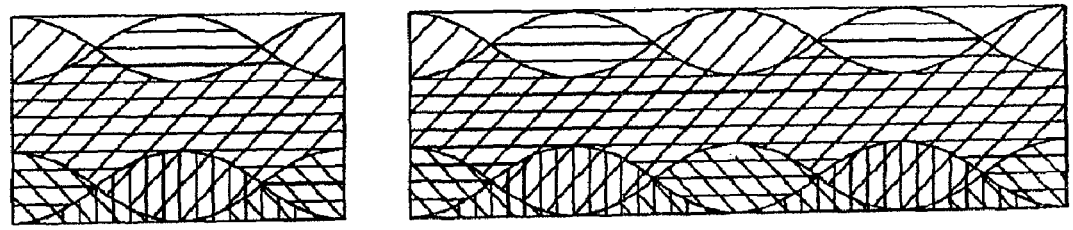

FIG. 30 shows the printing results of deformed data portion 36 created by mask pattern data 38a of basic type, and deformed data portion 36 created by mask pattern data 38c of developed type from portion (c). The print data having deformed data portion 36 created by mask pattern data 38a of basic type is supplied to Nos. 1, 3, and 5 printing heads 30, and the print data having deformed data portion 36 created by mask pattern data 38c of developed type from portion (c) is supplied to Nos. 2, 4, and 6 printing heads 30.

The deformed data portion 36 of the print data having deformed data portion 36 created by mask pattern data 38a of basic type is printed by Nos. 1, 3, and 5 printing heads 30 as shown in FIG. 30 (A). The deformed data portion 36 of the print data having deformed data portion 36 created by mask pattern data 38c of developed type from portion (c) is respectively printed by Nos. 2, 4, and 6 printing heads 30 as shown in FIG. 30 (B). The left side of FIG. 30 (C) shows the overlapped portion of mask pattern data 38a and 38c, and the right side of FIG. 30 (C) shows the complicated overlapped printing result of printing of deformed data portions of the print data by the Nos. 1, 2, 3, 4, 5, and 6 printing heads 30. The present invention is not particularly limited to the above configuration in which the deformed data portions 36 of the same phase are supplied to Nos. 1, 3, and 5 printing heads 30, and the deformed data portions of the same phase are supplied to Nos. 2, 4, and 6 printing heads 30, but the print data having deformed data portions created by mask pattern data different in phase may be supplied in individual printing heads.

The dot information deleted and decimated from the deformed data portion created by the mask pattern data created in every printing head 30 is complemented by the complementary data of the mask pattern used in every printing head.

In the preferred embodiment, by forming the deformed data portion changed in printing rate at the joint of the print data in the main scanning direction, the printing regularity at the joint of print data is eliminated, and randomness is generated, and by the synergistic effect with the streak generation preventive effect of the concave and convex shapes of the deformed data portion, generation of streaks at the joint is prevented. Another effect is suppression of continuation of printing in lateral direction from a nozzle of poor printing precision positioned at the end when nozzles for discharging the ink are arrayed in parallel.

In the preferred embodiment, the printing medium is conveyed at equal pitches of 50 nozzles each as mentioned above, but the pitches may be changed in every conveying operation. It is intended to print dots between nozzle pitches when printing at small nozzle pitches, and equal pitches are 50 nozzles, but the pitches may be changed in every conveying operation by feeding 49 nozzles or by feeding 51 nozzles. In the relation between the conveying of printing medium (paper) and scanning of printing head, printing and paper feed may be done by a going stroke of the printing head, and printing and paper feed may be done by a returning stroke of the printing head, but a same line may be printed by going stroke and returning stroke of the head, and hence the head scanning and paper feed are not limited to the illustrated methods in the preferred embodiment.

The controller 4 judges whether printing of data is completed at step 9 in FIG. 2 or not, and stops the printing if judged affirmatively.

Industrial Applicability

As described herein, the printing apparatus and the printing method of the present invention are particularly useful when printing images at high quality by using a printer, and the present invention is particularly suited to the ink jet printer of the type in which the head unit moves in the lateral direction.

What is claimed is:

1. A printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, wherein a deformed data portion is formed so that dots may not be arrayed continuously in the main scanning direction of the printing head in the end portions of the sub-scanning direction of the print data supplied in every main scanning operation of the printing head, and the profile of the end portions of the sub-scanning direction of the print data in the deformed data portion is set in an ambiguous state, and the ambiguous state of the profile is not in a state of a continuous profile line, when the printed profile is visually observed.

2. A printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, wherein a deformed data portion having concave and convex parts not arraying dots continuously in the main scanning direction of the printing head at the end portion is formed at the end portion side in the sub-scanning direction of the main data portion of the print data supplied in every main scanning operation of the printing head, the deformed data portion is composed of an outside region and an inside region divided from the profile of the concave and convex parts, and the outside region is a region for masking the print dot information, and the inside region is a region for printing the print dot information, the profile of the concave and convex parts is set in an ambiguous state, and the ambiguous state of the profile is not in a state of a continuous profile line, when the printed profile is visually observed, and thereby the printing rate of the inside region of the deformed data portion is changed.

3. A printing apparatus for moving a printing head and a printing medium relatively in a main scanning direction and a sub-scanning direction, supplying print data composed of a multiplicity of dot information on the printing head having a plurality of dot forming elements arrayed in parallel rows so as to overlap in the main scanning direction each along the sub-scanning direction, and printing an image on the surface of the printing medium, comprising deformed data generating means for generating a deformed data portion by forming concave and convex parts in the end portion of sub-scanning direction of the print data supplied to each printing head, so that the dots in the end portion of the print data may not be arrayed continuously in the main scanning direction of the printing head, and setting the profile of the end portion of the sub-scanning direction of the concave and convex parts in an ambiguous state, and keeping the ambiguous state of the profile not in a state of a continuous profile line, when the printed profile is visually observed, wherein the deformed data generating means generates the deformed data portion deviated in the phase of the concave and convex parts, and supplies the print data having the deformed data portion deviated in the phase of the concave and convex parts to the plurality of printing heads, and the deformed data portion deviated in the phase of the concave and convex parts is overlapped and printed by the plurality of printing heads.

4. A printing apparatus for moving a printing head and a printing medium relatively in a main scanning direction and a sub-scanning direction, supplying print data composed of a multiplicity of dot information on the printing head having a plurality of dot forming elements arrayed along the sub-scanning direction, and printing an image on the surface of the printing medium, comprising a plurality of printing heads arrayed in parallel rows to be overlapped in the main scanning direction, deformed data generating means for generating a deformed data portion by forming concave and convex parts in the end portion of the sub-scanning direction of the print data supplied to the printing head by the selected mask pattern data by selecting one of a plurality of mask pattern data mutually deviated in phase, so that the dots may not be arrayed continuously in the main scanning direction of the printing head, and setting the profile of the end portion of the sub-scanning direction of the concave and convex parts in an ambiguous state, and keeping the ambiguous state of the profile not in a state of a continuous line, when the printed profile is visually observed, and means for supplying print data having the deformed data portion deviated in the phase of the concave and convex parts to the plurality of printing heads, and overlapping and printing the deformed data portion deviated in the phase of the concave and convex parts by the plurality of printing heads.

5. The printing apparatus according to claim 1, wherein the deformed data portion is composed of an outside region and an inside region divided from the profile, and the outside region is a region for masking the print dot information, and the inside region is a region for printing the print dot information, a profile ambiguous state generating region in which the print dot information is decimated is provided in the portion of the profile of the inside region, and an ambiguous state of the profile is generated.

6. The printing apparatus according to claim 1, wherein the dot array of the profile of the deformed data portion has a shape of a waveform.

7. The printing apparatus according to claim 6, wherein at right and left sides of the crest portion of the profile of the deformed data portion, the printing density is high in the lower part and the printing density is low in the upper part, and the printing density higher portion is extended upward as nearing the middle, and the profile is set in an ambiguous state by the change in the printing density.

8. The printing apparatus according to claim 1, wherein printing of the image is completed sequentially in a unit of N times (N being an integer) of scanning of the printing head on the printing medium, and the print data of the image having the deformed data portion is supplied to the printing head.

9. The printing apparatus according to claim 1, wherein the deformed data portion is formed at the rear end portion of the sub-scanning direction of the print data including the ends of image among the print data supplied in every scanning on the printing head, the deformed data portion is formed at the front end portion and rear end portion of the sub-scanning direction of the print data of the intermediate portion of the image, and the deformed data portion is formed at the front end portion of the sub-scanning direction of the print data including the rear end portion of the image.

10. The printing apparatus according to claim 1, wherein complementary data is created for complementing the dot data deleted from the deformed data portion, and the deleted dot data of the deformed data portion is complemented by the complementary data.

11. The printing apparatus according to claim 5,
wherein the printing rate in the inside region of the deformed data portion is changed in the sub-scanning direction.

12. The printing apparatus according to claim 5,
wherein the printing rate in the inside region of the deformed data portion is changed in the main scanning direction.

13. The printing apparatus according to claim 5,
wherein the printing rate of the deformed data portion is changed along both the main scanning direction and the sub-scanning direction.

14. The printing apparatus according to claim 2,
wherein a region of 100% printing rate is provided at a side of the deformed data portion contacting with the main data portion, and the region of 100% printing rate and a region changed in the printing rate of the deformed data portion contact with each other in concave and convex profile.

15. The printing apparatus according to claim 10,
wherein the printing of the image is completed sequentially in a unit of N times (N being an integer) of scanning of the printing head on the printing medium, and the print data of the image having the deformed data portion changed in the printing rate, and the print data having the complementary data, and/or the print data having both the deformed data portion and complementary data are supplied to the printing head.

16. The printing apparatus according to claim 10,
wherein among the print data supplied in the printing head in every scanning, the deformed data portion is formed at the rear end portion of the sub-scanning direction of the print data including the leading end of the image, the deformed data portion is formed at the rear end portion of the sub-scanning direction of the print data in the intermediate portion of the image, and at the front end portion, complementary data for complementing the deformed data portion of the print data adjacent hereto is generated, and complementary data for complementing the deformed data portion of the print data adjacent thereto is generated at the front end portion of the sub-scanning direction of the print data including the rear end of the image.

17. The printing apparatus according to claim 2,
wherein a region changed in the printing rate forming the concave and convex parts is provided in the deformed data portion, a region of 100% printing rate is provided at the side contacting with the main data portion of the print data, and the region of 100% printing rate and the region changed in the printing rate of the deformed data portion contact with each other in concave and convex profile.

18. A printing method for printing on a printing medium by moving the printing head sequentially in a main scanning direction and delivering the printing medium in a sub-scanning direction in a print unit of print data of n (n being an integer) lines,
wherein lines at the end portion of the joint side repeat a concave and convex profile so that a specified number of lines at the joint side of the print data may not be arrayed continuously in the main scanning direction, and that the profile at the end portion of the sub-scanning direction of the concave and convex parts may be set in an ambiguous state, and that the ambiguous state may be free from apparent continuous profile lines when the printed profile is observed visually.

19. A printing method for printing on a printing medium by moving the printing head sequentially in a main scanning direction and delivering the printing medium in a sub-scanning direction in a print unit of print data of n (n being an integer) lines,
wherein lines at the end portion of the joint side repeat a concave and convex profile so that a specified number of lines at the joint side of the print data may not be arrayed continuously in the main scanning direction, and that the profile at the end portion of the sub-scanning direction of the concave and convex parts may be set in an ambiguous state, and that the ambiguous state may be free from apparent continuous profile lines when the printed profile is observed visually, and the printing rate in a specified range near the joint side is changed.

20. A printing method for printing on a printing medium by supplying print data of n (n being an integer) lines sequentially as a printing unit on a plurality of printing heads arrayed in parallel so as to be overlapped in a main scanning direction, moving the printing heads in the main scanning direction and delivering a printing medium in a sub-scanning direction,
wherein concave and convex parts are formed in the data of end portion of the sub-scanning direction of the print data supplied to each printing head so that the dots may not be arrayed continuously in the main scanning direction of the printing head, and the profile of the end portion of the sub-scanning direction of the concave and convex parts is set in an ambiguous state, and the ambiguous state is formed to generate the deformed data portion not obvious in a continuous profile line, when the printed profile is visually observed, and print data having the deformed data portion deviated in the phase of the concave and convex parts is supplied to the plurality of printing heads, and the deformed data portion deviated in the phase of the concave and convex parts is overlapped and printed by the plurality of printing heads.

21. A printing method for printing on a printing medium by supplying print data of n (n being an integer) lines sequentially as a printing unit on a plurality of printing heads arrayed in parallel so as to be overlapped in a main scanning direction, moving the printing heads in the main scanning direction and delivering a printing medium in a sub-scanning direction,
wherein a plurality of mask pattern data are generated by deviating the phase of a basic mask pattern, concave and convex parts are provided at the end portion of the sub-scanning direction of the main data portion of the print data supplied to each printing head so that the dots may not be arrayed continuously in the main scanning direction, and the profile of the end portion of the sub-scanning direction of the concave and convex parts is set in an ambiguous state, and the ambiguous state is formed to generate the deformed data portion not obvious in a continuous profile line, when the printed profile is visually observed, the deformed data portion deviated in the phase of the concave and convex parts is supplied to the plurality of printing heads, and the deformed data portion deviated in the phase of the concave and convex parts is overlapped and printed by the plurality of printing heads.

22. The printing method according to claim 18,
wherein the shape of the concave and convex parts is formed by deleting the dot information at the joint side of the print data by the mask pattern, and the deleted dot information is complemented by the concave and convex profile of the print data to be printed in a later scanning.

23. The printing method according to claim 22,
wherein the complementary data of the deleted dot information is created by inverting the mask pattern.

* * * * *